US005325195A

United States Patent [19]

Ellis et al.

[11] Patent Number: 5,325,195

[45] Date of Patent: Jun. 28, 1994

[54] VIDEO NORMALIZER FOR A DISPLAY MONITOR

[75] Inventors: George A. Ellis, Oakland; David M. Smith, Saratoga, both of Calif.

[73] Assignee: RasterOps Corporation, Santa Clara, Calif.

[21] Appl. No.: 696,908

[22] Filed: May 6, 1991

[51] Int. Cl.[5] .................... H04N 17/00

[52] U.S. Cl. .................... 358/189; 348/180

[58] Field of Search .................... 358/10, 139, 190, 903; 315/383; H04N 17/00

[56] References Cited

U.S. PATENT DOCUMENTS

| | | | |
|---|---|---|---|
| 4,037,249 | 7/1977 | Pugsley | 358/76 |
| 4,123,775 | 10/1978 | Bugni | 358/10 |
| 4,136,360 | 1/1979 | Hoffrichten | 358/80 |
| 4,141,072 | 2/1979 | Perreault | 364/353 |
| 4,212,072 | 7/1980 | Huelsman et al. | 364/575 |
| 4,285,580 | 8/1981 | Murr | 351/35 |
| 4,307,962 | 12/1981 | Jung | 356/405 |
| 4,309,770 | 1/1982 | Godard | 375/14 |
| 4,415,921 | 11/1983 | Mulvanny et al. | 358/139 |
| 4,500,919 | 2/1985 | Schreiber | 358/78 |
| 4,658,286 | 4/1987 | Schwartz et al. | 358/37 |
| 4,688,079 | 8/1987 | Fendley | 358/10 |
| 4,746,970 | 5/1988 | Hosokawa et al. | 358/10 |
| 4,814,858 | 3/1989 | Mochizuki et al. | 358/10 |
| 4,893,925 | 1/1990 | Sweeney et al. | 358/139 |
| 4,963,828 | 10/1990 | Kawame et al. | 358/10 |
| 5,077,600 | 12/1991 | Ichigaya et al. | 358/10 |

*Primary Examiner*—Victor R. Kostak
*Attorney, Agent, or Firm*—Skjerven, Morrill, MacPherson, Franklin & Friel

[57] ABSTRACT

A video normalizer corrects for irregularities characteristic of video display monitor screens, so as to provide accurate and consistent light levels and color intensities. The normalizer is especially useful for computer controlled editing of video data for the graphics industry. The video normalizer includes a photo sensor for measuring the monitor light output at various locations on the monitor CRT screen, and digital circuitry for providing a correction value for each portion of the monitor screen, with the correction value being applied to the output of a conventional colorgraphics board (video display card) which drives the monitor.

9 Claims, 24 Drawing Sheets

VIDEO NORMALIZER FOR A DISPLAY MONITOR

BACKGROUND OF THE INVENTION

1. Field of the Invention

This invention relates to processing of video signals, and more specifically to correction of light intensities output by the screen of a computer display monitor.

2. Description of the Prior Art

Display monitors (such as used in computer systems) tend to output varying amounts of light as a function of position on the monitor CRT (cathode ray tube) screen for a given pixel value (level of light intensity). Monitor screen light output also tends to vary in "color temperature" from unit to unit. Color temperature is a well known measure of intensity which typically is a function of the mix of colors which make up white light. These deficiencies cause inaccurate and inconsistent representations of graphics images on the monitor.

Some prior art CRT's used in monitors are manufactured to compensate for the undesirable tendency of CRT's to be bright in the center and less intense on the edges; the result typically is to provide somewhat lessened intensity variation; however, an undesirable "target" pattern in color intensity which is not 100% uniform is still present. Also, not all monitors have this built-in compensation.

This variation in color intensity is especially problematic when the monitor is used as part of a computer system for editing and processing of color images, such as in the printing industry. In this case, the variations in light intensity tend to cause undesirable color variations in the displayed image versus the intended image, which is typically a photographic image with true colors.

SUMMARY OF THE INVENTION

A video normalizer in accordance with the invention measures light output irregularities of a display monitor and adjusts the gamma (linearity of response) corrections and output signals of a connected conventional video color processing board which drives the display monitor, to compensate for these irregularities. Typical applications are in proof press (printing), film recording, and other graphics applications using computer image processing.

The video normalizer in accordance with the invention includes a photo sensor for detecting luminance light intensity and/or color temperature. The light measurements detected by the photo sensor are processed digitally to compute correction information for use by a frame buffer and other circuitry, providing a signal to adjust (skew) the output signals of the video color processing board, so that the video color processing board in conjunction with a conventional CRT display monitor displays colors which are uniform, in spite of the typical undesirable non-uniform display characteristics of the CRT.

In one embodiment, the light measurements detected by the photosensor are converted to digital signals and then processed by a video processor to calculate the desired correction values. These correction values are then provided to a frame buffer having a memory location for each pixel on the monitor display. The frame buffer outputs a digital correction signal which is converted to an analog correction signal by a correction circuit. The analog output signal of the correction circuit is used either to skew the output signals of the video color processing board or to control transconductance amplifiers connected between the video color processing board and the respective R, G, B inputs of the monitor. A host computer provides a user interface to the video normalizer and controls the video processor via a micro-processor resident in the video normalizer.

Thus the system (under control of a host computer) corrects for the deficiency of the CRT which undesirably outputs varying amounts of light at each location on the CRT surface. The system, by adjusting the gamma correction of the video color processing board, thus corrects color differences between the image displayed on the monitor and the intended graphic image, and also adjusts the color temperature of the displayed image.

DETAILED DESCRIPTION OF THE INVENTION

Figure 1:
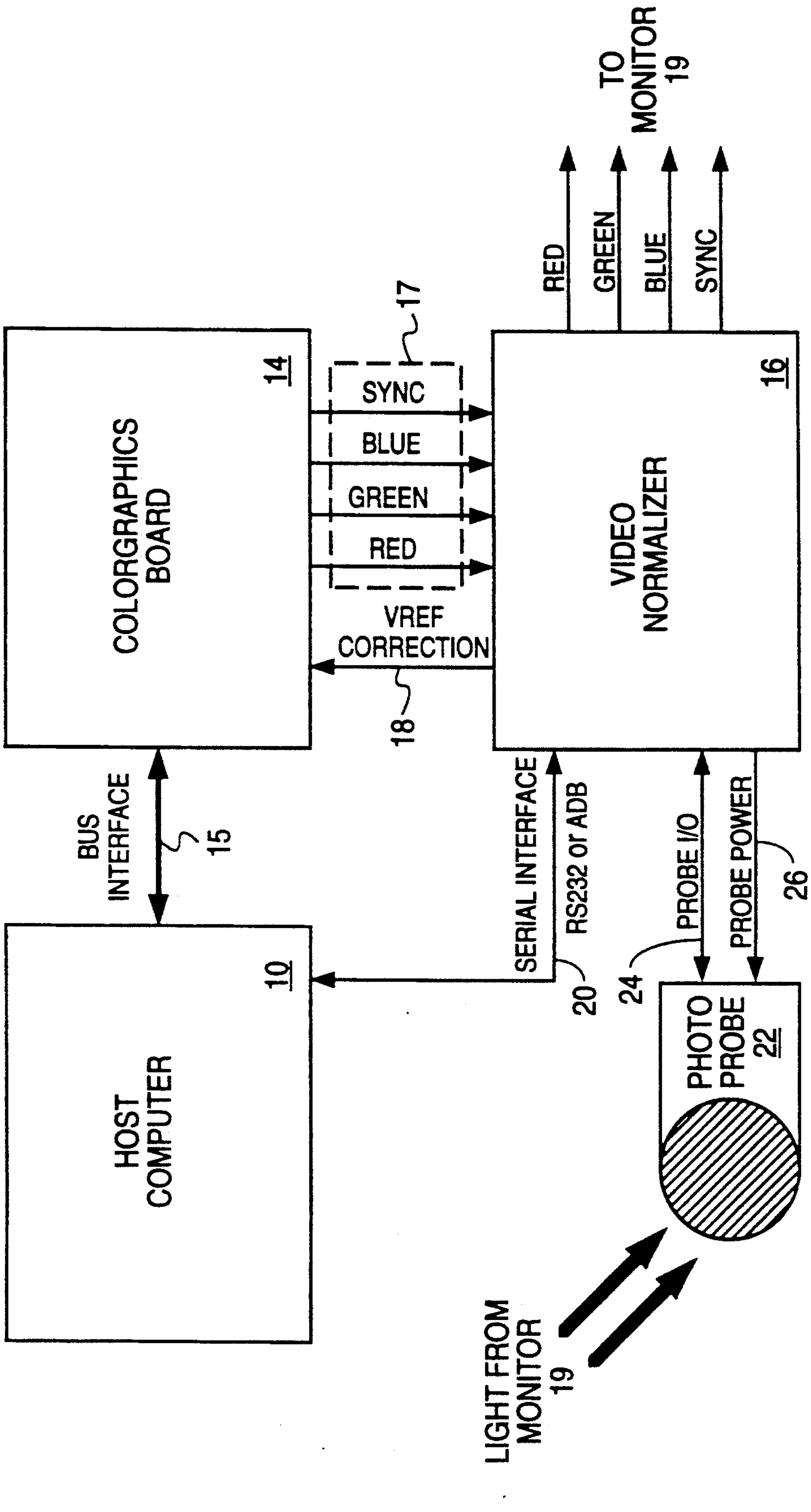
FIG. 1 shows a video normalizer system in accordance with the invention.

A system in accordance with the invention is shown in FIG. 1, including a conventional host computer 10 (such as a Macintosh® or IBM compatible personal computer), and a conventional colorgraphics board (also conventionally referred to as a video display card or video color processing board) 14 which is inserted into computer 10 for use in editing and manipulating video images. An example of colorgraphics board 14 is the model CB24XL commercially available from Rasterops, Inc., Santa Clara, Calif.

Board 14 connects to host computer 10 by a conventional computer bus interface 15. Video normalizer 16 receives RGB (red, green, blue) and video sync signals 17 from board 14, and provides VREF CORRECTION (voltage reference correction) 18 to board 14. In the case of systems (video display cards) that do not have VREF CORRECTION, the normalizer performs correction of the video signal by the use of transconduction amplifiers (shown in FIG. 2) to vary the gain of color board 14 output. Video normalizer 16 thus provides RGB (red, blue, green) and sync signals to a conventional video monitor 19, and is connected to host computer 10 by a serial interface 20 which is a conventional RS232 interface or ADB (Apple Desk Bus) for a Macintosh host computer 10. Photo probe 22 (a photo sensor with analog to digital conversion) is connected to video normalizer 16 as shown for providing and receiving data signals 24 (probe I/O) and probe electric power 26.

Figure 2:
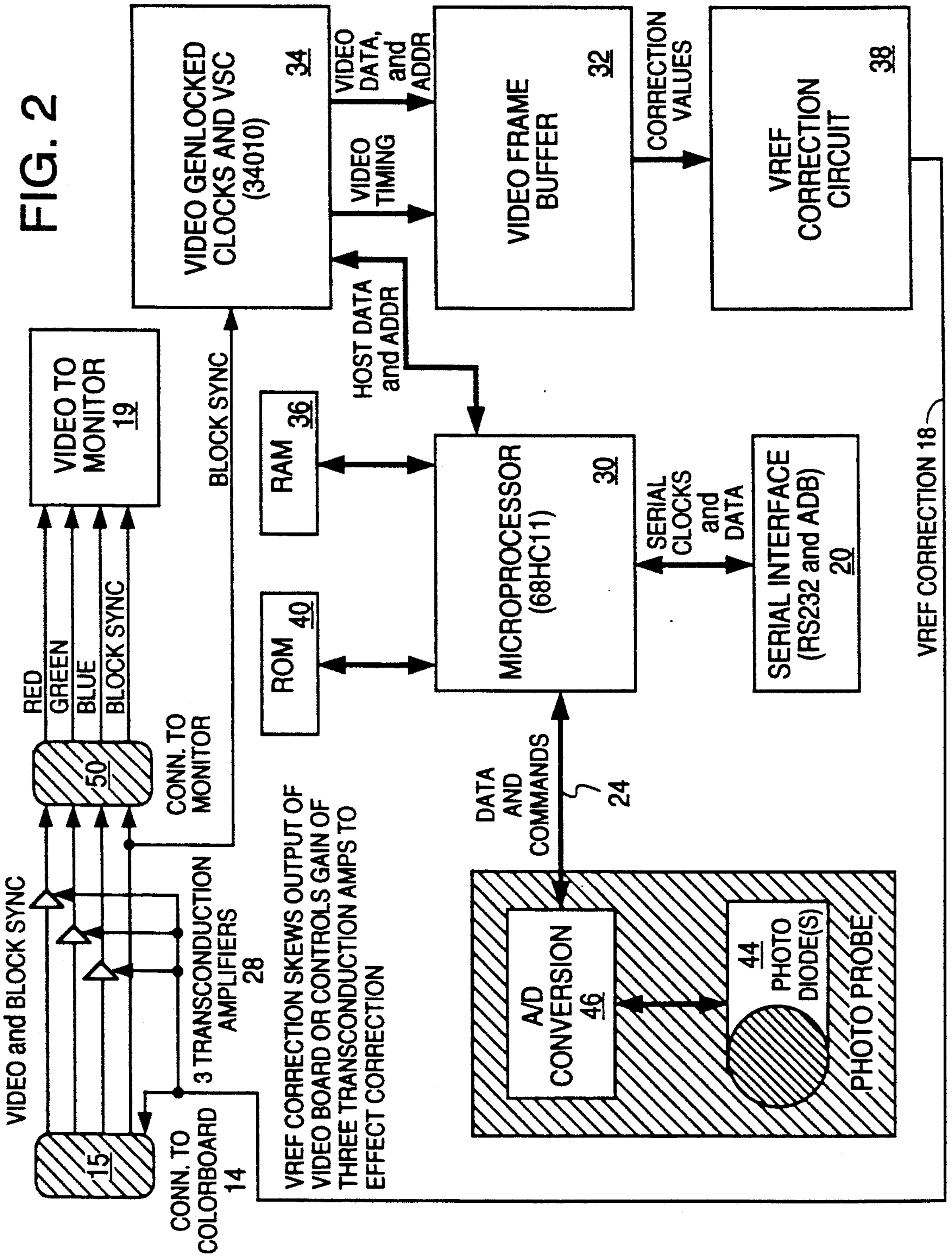
FIG. 2 shows the video normalizer circuitry in accordance with the invention.

As seen in greater detail in FIG. 2, the video normalizer 16 of FIG. 1 includes two major components, a remote photo probe 22 and a video normalizer 16 including transconduction amplifiers 28, a 68HC11 (commercially available from Motorola and in one embodiment a model 68HC11E1) microprocessor 30, a conventional video frame buffer 32, video genlocked clocks and VSC (video system controller or video processor) 34, RAM (random access memory) 36, serial interface 20, DAC correction circuitry 38, and a program ROM (read only memory) 40. Photo probe 22 and some of the associated software are also described in co-pending U.S. Pat. No. 5,168,320 filed Sep. 7, 1990. The photo probe 22 includes a conventional single photo diode or three photo diode pickup 44 for respectively a monochrome or a color application, and analog to digital conversion circuit 46 which provides digital data from the photo probe 22 of the color temperature or luminance information.

When used for color correction, the photo probe 22 is placed on a support stand in front of the screen of monitor 19. When used to measure geometric luminance correction, probe 22 is placed at specific locations directly on the surface of the CRT of monitor 19 and held in place by the user who then momentarily depresses a switch on the probe 22 to take a reading of the monitor 19 at that position.

In addition to CRT readings, the probe 22 can analyze opaque surfaces (such as photographs) by emitting a pulse of light (from a light source mounted within the probe) and reading the color values of the resultant reflected light pulse.

The video normalizer 16 of FIG. 1 is in one embodiment a stand-alone electronics board assembly in a conventional plastic housing and powered by a conventional external power supply. An 8-bit micro-processor 30 controls acquisition of data from the probe 22, controls the frame buffer 32 via the video system controller 34, computes correction information for circuitry 38, and controls serial I/O 20.

Frame buffer 32 is a scalable buffer with a maximum size of 512×512×16 bits/location. Two 8-bit pixels (odd and even) are stored at each location, so the maximum buffer size is 1,024×512×8-bits. The 16-bit structure is used because the unused portion of the video RAM 32 is used by the video processor 34 (see below) to execute a control program, and this execution is limited to 16-bit transfers. The output of frame buffer 32, via correction circuit 38, skews the VREF input of the output DACS (digital to analog converters) of the colorboard 14, thus modifying the DAC output to effect the geometric luminance correction. In the case that VREF is not available, the output of frame buffer 32 controls the gain of three transconduction amplifiers 28 through which the RGB signals are passed, and thus performs the correction.

Color correction is achieved by modifying the gamma correction values applied to the colorboard 14 via color look up tables resident in the DAC of the colorboard 14.

The frame buffer 32 is synchronized to the composite sync of the colorboard 14 via a connector 50 that is also the pass-through for the analog video signal of the colorboard 14 provided via connector 15 in video normalizer 16. Connector 15 also provides the VREF correction 18 interface to the color board 14. The video genlocked clocks circuitry 34 uses the horizontal and vertical sync signals (block sync) from colorboard 14 to operate a conventional pixel clock phase-locked to the horizontal and vertical syncs for synchronizing the normalizing frame buffer 32 to the color board 14. The pixel clock operates at one half the resolution of color board 14. The pixel clock for the frame buffer 32 is programmable through the host computer 10 by serial interface 20, using a program resident in computer 10 (described below), and enables scaling of the frame buffer 32 to match the resolution and pixel rates of the colorboard 14.

Serial I/O 20 provides communication between the host computer 10 and other peripherals. Both RS232 and ADB serial interfaces are provided.

On-board software resident in ROM 40 acquires data from the photo probe 22, which is analyzed by conventional Fast Fourier Transform techniques and the results passed to the host computer 10. For color correction, the host computer 10 then calculates the necessary changes to be loaded into the CLUTs (color look-up tables) of a conventional video DAC on colorboard 14 to modify the gamma curves of the colorboard 14, thus effecting the color correction.

Geometric luminance correction requires a different interaction between the video normalizer 16 and the host computer 10:

1) The host computer 10 directs the user via applications software (described below) to sample various points on the surface of the CRT 19 using probe 22, and receives via the normalizer 16 serial I/O 20 luminance information for discrete Cartesian coordinates on the colorboard raster and stores the co-ordinates to a table.

2) Once the tables are generated for various monitors (described below), one table is recalled to produce a normalization raster to correct the corresponding CRT 19. The geometric luminance values are sent back from host computer 10 to the normalizer 16 (via serial input/output interface 20 between the normalizer 16 and host computer 10) which computes an inverse line averaging algorithm to fill all the pixels of the video normalizer frame buffer 32. This lowers the amount of serial input/output needed, thus reducing the time needed to fill the raster (i.e., frame buffer 32).

3) The digital output signal of the frame buffer 32, which is synchronous to the colorboard 14, is converted to an analog voltage by a conventional video DAC in frame buffer 32 and fed to a scaling and DC offset correction circuit 38 to produce a normalization voltage on VREF correction line 18 which skews the VREF reference of the video DAC of the colorboard 14, or skews the gain of the transconduction amplifiers 28 (if VREF correction is not available), thus correcting for the irregularities of the CRT 19.

Since the processor 30 only addresses 64 K of address space, interfacing is as follows;

1) A commercially available (from Texas Instruments) TMS34010 video processor is part of block 34 and generates address and timing data for the conventional VRAM in frame buffer 32. Addressing the TMS34010 video processor is by conventionally loading its registers.

2) All interfaces to various parts of the video section of the TMS34010 video processor are addressed via subaddresses through a decoded chip select port.

3) Code (software) for the video processor in block 34 may be stored in a portion of the VRAM (video RAM) in block 32 not needed for frame storage.

Regarding the various ports:

1) A DP8531 integrated circuit (commercially available from National Semiconductor Corp.) is the pixel clock generator in block 34, to provide programmability of pixel rates. The DP8531 has sixteen 4-bit registers that need to be written to program the pixel clock generator. Registers ADO-3 load the data register of the 8531. Registers LADO-3 decode the address of the 16 registers. A decoded latch signal will be needed to write the data. The signal is labeled DP8531_WR and is active HIGH. The address space for the DP8531 is from A600 to A7FF. These address decodes are repeated redundantly 32 times within this space.

2) A BT478 RAMDAC integrated circuit (commercially available from Brooktree) is the DAC in frame buffer 32 and has an 8 bit data bus connected to bus ADO-7 and two separate strobes one for write, -BT478_WR, and one for read -BT478_RD. Each is active LOW. The address space for the BT478 is from A400 to A5FF. This address decodes are repeated redundantly 64 times within this space. (See Table A.)

TABLE A

| ADDRESS | REGISTER | |
|---|---|---|
| A400 | ADDRESS (RAM WRITE) | R/W |
| A401 | COLOR PALLET RAM | R/W |
| A402 | PIXEL READ MASK | R/W |
| A404 | ADDRESS (OVERLAY WRITE) | R/W |
| A405 | OVERLAY REGISTER | R/W |
| A406 | RESERVED | |
| A407 | ADDRESS (OVERLAY READ) | R/W |

3) The TMS34010 video processor host interface port (which is part of block 34) provides the host computer 10 with access to four programmable 16-bit registers which are mapped into four locations (subaddresses) in the host computer 10 I/O space. Through this interface, commands, status information, and data are transferred between the TMS34010 video processor and the host. Because the processor 30 is an eight bit processor, these registers are loaded in a HIGH/LOW byte-wise transfer. The TMS34010 video processor register space is from A200 to A3FF (this is the decode space for -HCS). This address decodes are repeated redundantly 32 times within this space. (See Table B).

TABLE B

| ADDRESS | REGISTER |
|---|---|
| A200 | HSTADRL (LOW BYTE) |
| A201 | HSTADRL (HIGH BYTE) |
| A202 | HSTADRH (LOW BYTE) |
| A203 | HSTADRH (HIGH BYTE) |
| A204 | HSTDATA (LOW BYTE) |
| A205 | HSTDATA (HIGH BYTE) |
| A206 | HSTCTL (LOW BYTE) |
| A207 | HSTCTL (HIGH BYTE) |

4) Serial ports for both the photo probe 22 (via an 6-pin DIN connector) and for serial communication 20 with the host computer 10 (via RS-232 or ADB) are provided and voltage translation performed. The RS-232 interface is via a 9-pin D-Sub connector. The ADB is provided via two 4-pin mini DIN connectors. An AUX register (write only) enables the ADB. A 1 enables it, a 0 disables it. This register is in address space B800-B9FF.

5) A ROM ENABLE decode enables the ROM 40 data onto the processor 30 bus. The ROM address space is set to be either 32 K or 48 K in size depending on the state of PA5 (bit 6 of the PA register of the processor 30.

The processor 30 bus structure has five bidirectional ports PA0-7, PB0-7, PC0-7, PD0-5 and PE0-7. PE0-7 is not used. PA0-7 and PD0-5 are used for the serial communication 24 of the photo probe 22, ADB, and RS-232 interfaces. PB0-7 drives the high order address bits, ADS-AD15 respectively and PC0-7 multiplexes the low order addresses AD0-7 and the data D0-7. The low order address lines are latched to produce LAD0-7 during the address portion of the address/data muxed signal.

Figure 3:
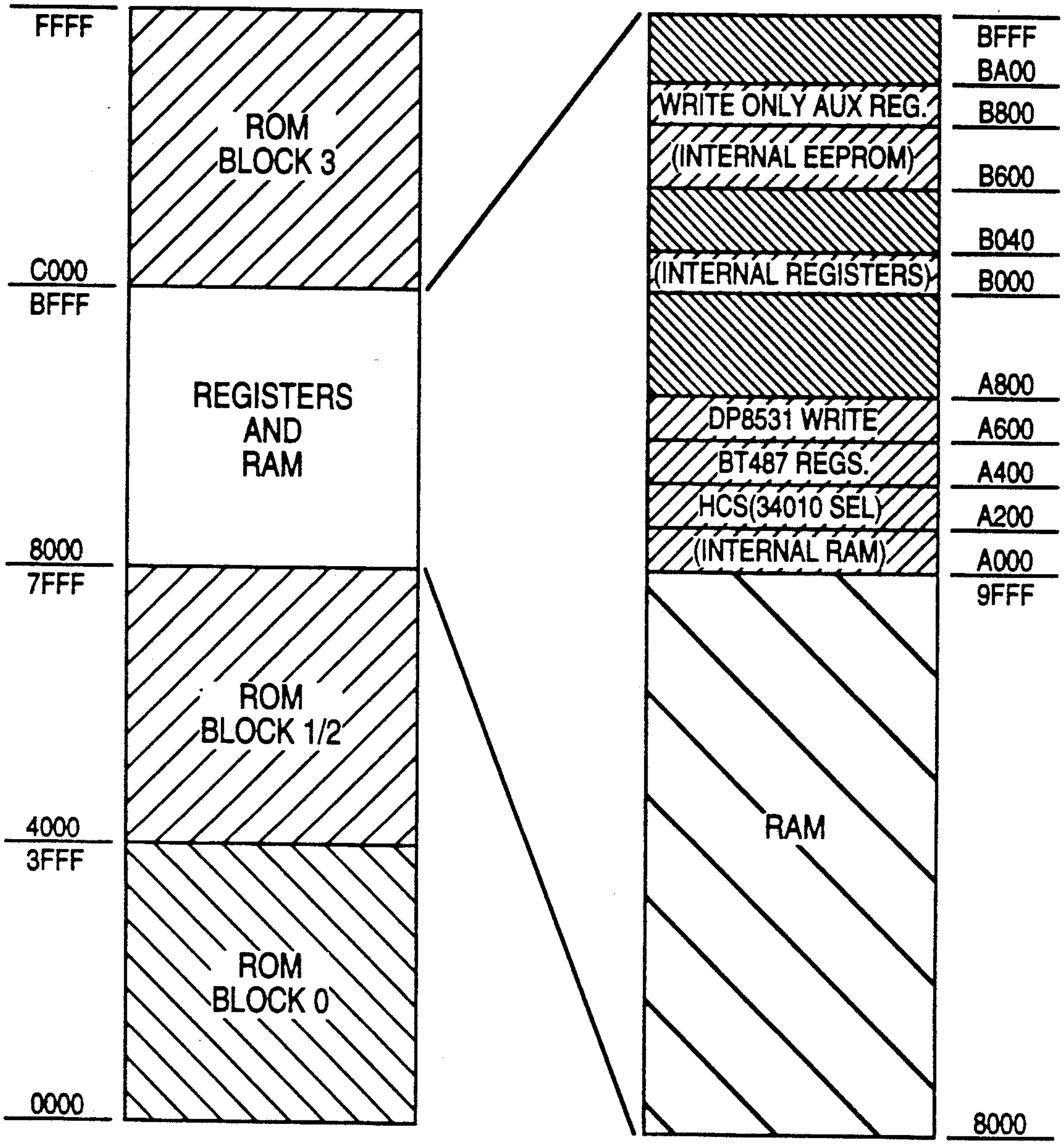
FIG. 3 shows a memory map of the video normalizer.

FIG. 3 is a memory map of the video normalizer 16 for both RAM 36 and ROM 40.

The TMS34010 video processor is I/O interfaced. Twenty-eight 16-bit registers occupy addresses C0000000 to C00001FF. These registers can be directly read by the TMS34010 video processor and they can be indirectly accessed by the host computer 10 through the host interface registers. There are four categories of registers:

1) Host interface registers
2) Local memory interface registers
3) Interrupt control registers
4) Video timing and screen refresh registers These registers are described in chapter 6 of the published TMS34010 User Guide.

The video normalizer 16 in one embodiment supports four resolutions. They are the following:

1) 1280 Horz. by 1024 Vert. using the commercially available (from RasterOps) 1964S monitor with a RasterOps CB228 colorboard.

2) 1152 Horz. by 900 Vert. using the commercially available (from RasterOps) 1961S monitor with the RasterOps 1424 colorboard for the Sun computer platform.

3) 1024 Horz. by 768 Vert. using the commercially available (from RasterOps) 1960S monitor with the RasterOps CB24XL colorboard.

4) 1152 Horz. by 870 Vert. using the commercially available (from RasterOps) 2168 monitor with the RasterOps CB24XL colorboard.

Examples 1), 3) and 4) run on a Macintosh host computer 10.

The following are the register settings and display specs for the normalization raster for the above 4 examples:

Case 1) 1964S Monitor

Visible Resolution: 640 Horz. by 1024 Vert. (Horz. rate is one half the rate of the colorboard being normalized)

| | |
|---|---|
| Total Resolution: | 840 Horz. by 1064 Vert. |
| Pixel Clock | 53.787 MHz |
| Vidclock: | 6.7233 MHz |
| Horz. Rate: | 64.0316 KHz |
| Vert. Rate: | 60.18 Hz |
| Horz. Sync: | 88 Pixels |
| Horz. Front Porch: | 16 Pixels |
| Horz. Back Porch: | 96 Pixels |
| Vert. Sync: | 3 Lines |
| Vert. Front Porch: | 3 Lines |
| Vert. Back Porch: | 34 Lines |
| TMS34010 VIDEO REGISTERS: (Register values are in hex) | |
| Horz Total: | FFFF |
| Horz End Sync: | A |
| Horz End Blank | 16 |
| Horz Start Blank: | 66 |
| Vert Total | FFFF |
| Vert End Sync: | 2 |
| Vert End Blank: | 24 |
| Vert Start Blank: | 424 |
| DPYCTL | D010 |
| DPYSTRT | FFFC |
| PSIZE | 10 |
| DP8531 Pixel Clock Generator REGISTERS: (values in hex) | |
| ADDRS. | DATA |
| 0 | 0 |
| 1 | 9 |

-continued

| | |
|---|---|
| 2 | 6 |
| 3 | 0 |
| 4 | A |
| 5 | 1 |
| 6 | 0 |
| ADDRS. | DATA |
| 7 | 7 |
| 8 | 1 |
| 9 | 1 |
| A | 2 |
| B | 6 |
| C | 4 |
| D | 9 |
| E | 0 |
| F | 0 |

This sets the DP8531 for the following parameters:

| | |
|---|---|
| REF1: | .064032 MHz (Horz. Freq.) |
| Pixel Clock: | 53.786880 MHz |
| VCO Freq: | 107.573760 MHz |
| S Clock: | 6.72336 MHz (Vidclock) |
| N: | 1680 |
| P: | 2 |
| S: | 8 |

Case 2) 1961S Monitor

Visible Resolution: 576 Horz. by 900 Vert. (Horz. rate is one half the rate of the colorboard being normalized.

| | |
|---|---|
| Total Resolution: | 752 Horz. by 937 Vert. |
| Pixel Clock: | 46.47025 MHz |
| Vidclock: | 5.808824 MHz |
| Horz. Rate: | 61.795545 KHz |
| Vert. Rate: | 65.95042 Hz |
| Horz. Sync: | 64 Pixels |
| Horz. Front Porch: | 20 Pixels |
| Horz. Back Porch: | 92 Pixels |
| Vert. Sync: | 5 Lines |
| Vert. Front Porch: | 2 Lines |
| Vert. Back Porch: | 30 Lines |
| TMS34010 VIDEO REGISTERS: (Register values are in hex) | |
| Horz Total: | FFFF |
| Horz End Sync: | 7 |
| Horz End Blank: | 13 |
| Horz. Start Blank: | 5B |
| Vert Total: | FFFF |
| Vert End Sync: | 4 |
| Vert End Blank: | 22 |
| Vert Start Blank: | 3A6 |
| DPYCTL | D010 |
| DPYSTRT | 1 |
| PSIZE | 10 |
| DP8531 Pixel Clock Generator REGISTERS: (values in hex) | |
| ADDRS. | DATA |
| 0 | 0 |
| 1 | E |
| 2 | 5 |
| 3 | 0 |
| 4 | B |
| 5 | 1 |
| 6 | 0 |
| 7 | 7 |
| 8 | 1 |
| 9 | 1 |
| A | 2 |
| B | 6 |
| C | 4 |
| D | 9 |
| E | 0 |
| F | 0 |

This sets the DP8531 for the following parameters:

| | |
|---|---|
| REF1: | .061.796 MHz (Horz. Freq.) |
| Pixel Clock: | 46.470592 MHz |
| VCO Freq: | 92.941184 MHz |
| S Clock: | 5.808824 MHz (Vidclock) |
| N: | 1504 |
| P: | 2 |
| S: | 8 |

Case 3) 1960S Monitor

Visible Resolution: 512 Horz. by 768 Vert. (Horz. rate is one half the rate of the colorboard being normalized)

| | |
|---|---|
| Total Resolution: | 664 Horz. by 803 Vert. |
| Pixel Clock; | 40.0000 MHz |
| Vidclock: | 5.0000 MHz |
| Horz. Rate: | 60.24096 KHz |
| Vert Rate: | 75.02 Hz |
| Horz. Sync: | 40 Pixels |
| Horz. Front Porch: | 40 Pixels |
| Horz. Back Porch: | 72 Pixels |
| Vert. Sync: | 3 Lines |
| Vert. Front Porch: | 3 Lines |
| Vert. Back Porch: | 29 Lines |
| TMS34010 VIDEO RESISTERS: (Register values are in hex) | |
| Horz. Total: | FFFF |
| Horz End Sync: | 4 |
| Horz Enc Blank: | D |
| Horz Start Blank: | 4D |
| DPYCTL | D010 |
| DPYSTRT | FFFC |
| PSIZE | 10 |
| Vert Total: | FFFF |
| Vert End Sync: | 2 |
| Vert End Blank: | 1F |
| Vert Start Blank: | 31F |
| DP8531 Pixel Clock Generator REGISTERS: (VALUES IN HEX) | |
| ADDRS. | DATA |
| 0 | 0 |
| 1 | 6 |
| 2 | A |
| 3 | 0 |
| 4 | B |
| 5 | 1 |
| 6 | 0 |
| 7 | 3 |
| 8 | 1 |
| 9 | 2 |
| A | 2 |
| B | 6 |
| C | 4 |
| D | 9 |
| E | 0 |
| F | 0 |

This sets the DP8531 for the following parameters:

| | |
|---|---|
| REF1: | .068681318 MHz (Horz. Freq.) |
| Pixel Clock: | 50.000 MHz |
| VCO Freq: | 100.000 MHz |
| S Clock: | 6.2500 MHz (Vidclock) |
| N: | 1456 |
| P: | 2 |
| S: | 8 |

Case 4) 2168 Monitor

Visible Resolution: 576 Horz. by 870 Vert. (Horz. rate is one half the rate of the color board being normalized)

| | | | |
|---|---|---|---|
| Total Resolution: | | 728 Horz. by 915 Vert. | |
| Pixel Clock: | | 50.0000 MHz | |
| Vidclock: | | 6.2500 MHz | |
| Horz. Rate: | | 68.681318 KHz | |
| Vert. Rate: | | 75.06155 Hz | |
| Horz. Sync: | | 64 Pixels | |
| Horz. Front Porch: | | 16 Pixels | |
| Horz. Back Porch: | | 72 Pixels | |
| Vert. Sync: | | 3 Lines | |
| Vert. Front Porch: | | 3 Lines | |
| Vert. Back Porch: | | 39 Lines | |
| TMS34061 VIDEO REGISTERS: (Register values are in hex) | | | |
| Horz Total: | C000 | 0030 | FFFF |
| Horz End Sync: | C000 | 0000 | 7 |
| Horz End Blank: | C000 | 0010 | 10 |
| Horz Start Blank: | C000 | 0020 | 58 |
| Vert Total: | C000 | 0070 | FFFF |
| Vert End Sync: | C000 | 0040 | 2 |
| Vert End Blank: | C000 | 0050 | 29 |
| Vert Start Blank: | C000 | 0060 | 38F |
| DPYCTL | C000 | 0080 | D010 |
| DPYSTRT | C000 | 0090 | FFFC |
| PSIZE | C000 | 0150 | 10 |
| DP8531 Pixel Clock Generator REGISTERS: (values in hex) | | | |
| ADDRS. | | DATA | |
| A200 | | 0 | |
| A201 | | B | |
| A202 | | 5 | |
| A203 | | 0 | |
| A204 | | B | |
| A205 | | 1 | |
| A206 | | 0 | |
| A207 | | 7 | |
| A208 | | 1 | |
| A209 | | 1 | |
| A20A | | 2 | |
| A20B | | 6 | |
| A20C | | 4 | |
| A20D | | 9 | |
| A20E | | 0 | |
| A20F | | 0 | |

This sets the DP8531 for the following parameters:

| | |
|---|---|
| REF1: | 068681318 MHz (Horz. Freq.) |
| Pixel Clock: | 50.000 MHz |
| VCOFreq. | 100.000 MHz |
| SClock: | 6.2500 MHz (Vidclock) |
| N: | 1456 |
| P: | 2 |
| S: | 8 |

In one embodiment, for the 640 by 1024 normalization raster which is the highest resolution of the above four examples, the total memory size used will be 640 pixels horizontal by 512 lines vertical, since each pair of lines contain the same data. Thus only half the vertical memory is needed. This will require 10 bits of column addressing, CA0–CA9 and 9 bits of row addressing, RA0–RA8. CA1–9 and RA0–8 are multiplexed as local memory VRAMADDO-8. (See Table C)

TABLE C

| LOCAL MEMORY ADDR. | COLUMNR | ROW X |
|---|---|---|
| VRAMADD0 | CA0 | RA0 |
| VRAMADD1 | CA1 | RA1 |
| VRAMADD2 | CA2 | RA2 |
| VRAMADD3 | CA3 | RA3 |
| VRAMADD4 | CA4 | RA4 |
| VRAMADD5 | CA5 | RA5 |
| VRAMADD6 | CA6 | RA6 |
| VRAMADD7 | CA7 | RA7 |

TABLE C-continued

| LOCAL MEMORY ADDR. | COLUMNR | ROW X |
|---|---|---|
| VRAMADD8 | CA8 | RA8 |

The TMS34010 video processor interfaces to the video RAM via a triple multiplexed bus called LMAD0-15 which contains the row and column addresses and the data. The column address is latched with -LAL, a signal from the TMS34010, due to the fact that the column address ceases to be valid when CAS drops. A signal called -DEN, also supplied by the 34010, is used to gate DATA from bus LMAD0-15.

Figure 4:
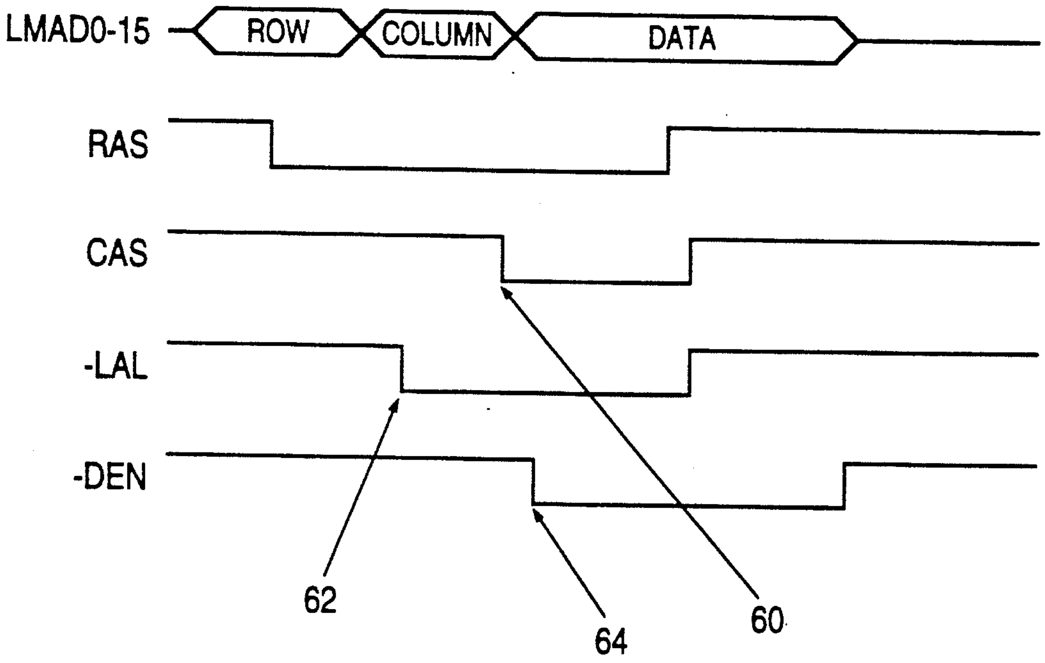
FIG. 4 shows a timing diagram of the video normalizer local memory.

FIG. 4 shows timing for local memory. As shown at 60 the leading edge of the signal on line CAS indicates that CAS does not become active until the column address becomes invalid. -LAL at 62 is used to latch and extend the column address to the point when CAS goes low. -DEN at 64 gates the period that data is valid or can be safely written.

Figure 5A:
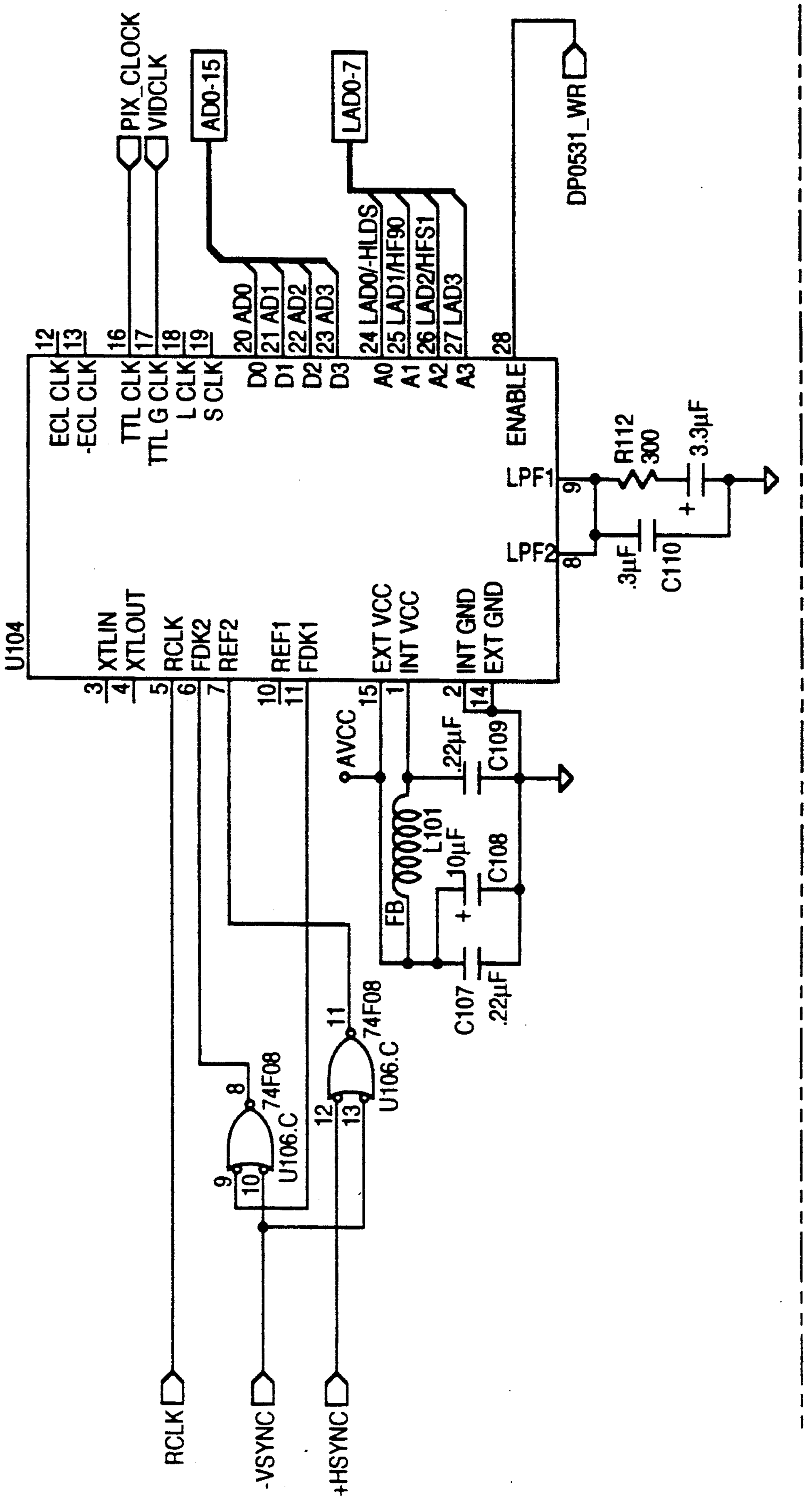
FIGS. 5A, 5B, 6A, 6B, 7A, 7B, 8, 9A, 9B, 10A, 10B, 10C, 10D, 10E, 10F, 11A and 11B show the video normalizer circuitry schematically.
Figure 5B:
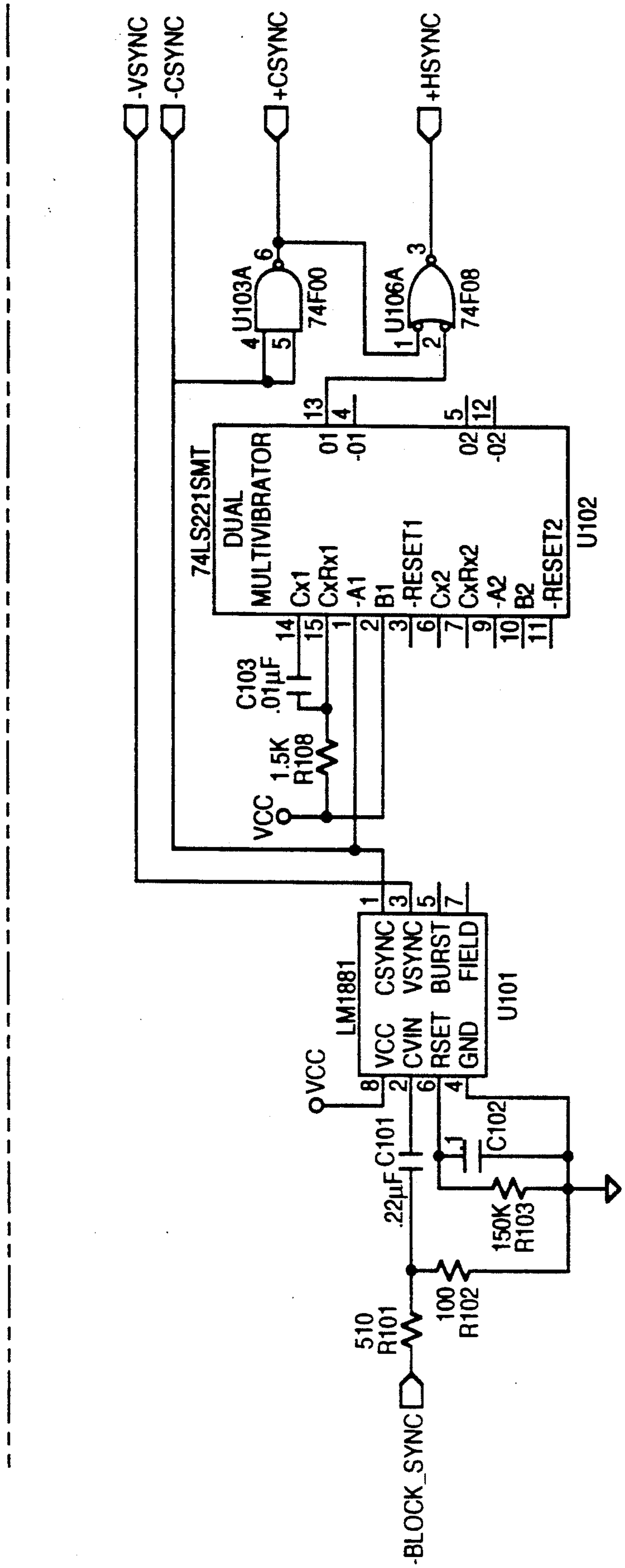
Figure 5D:
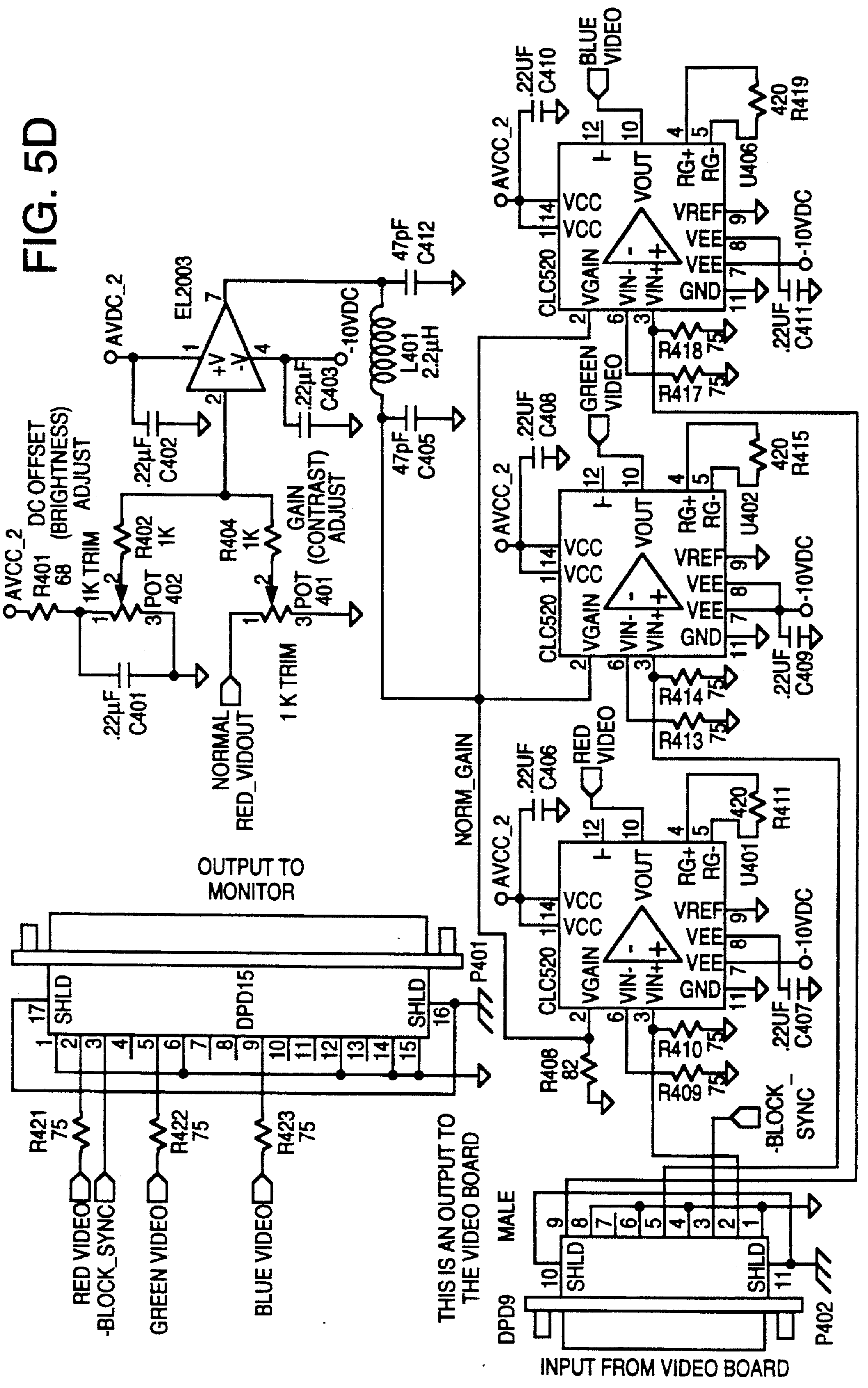
Figure 6:
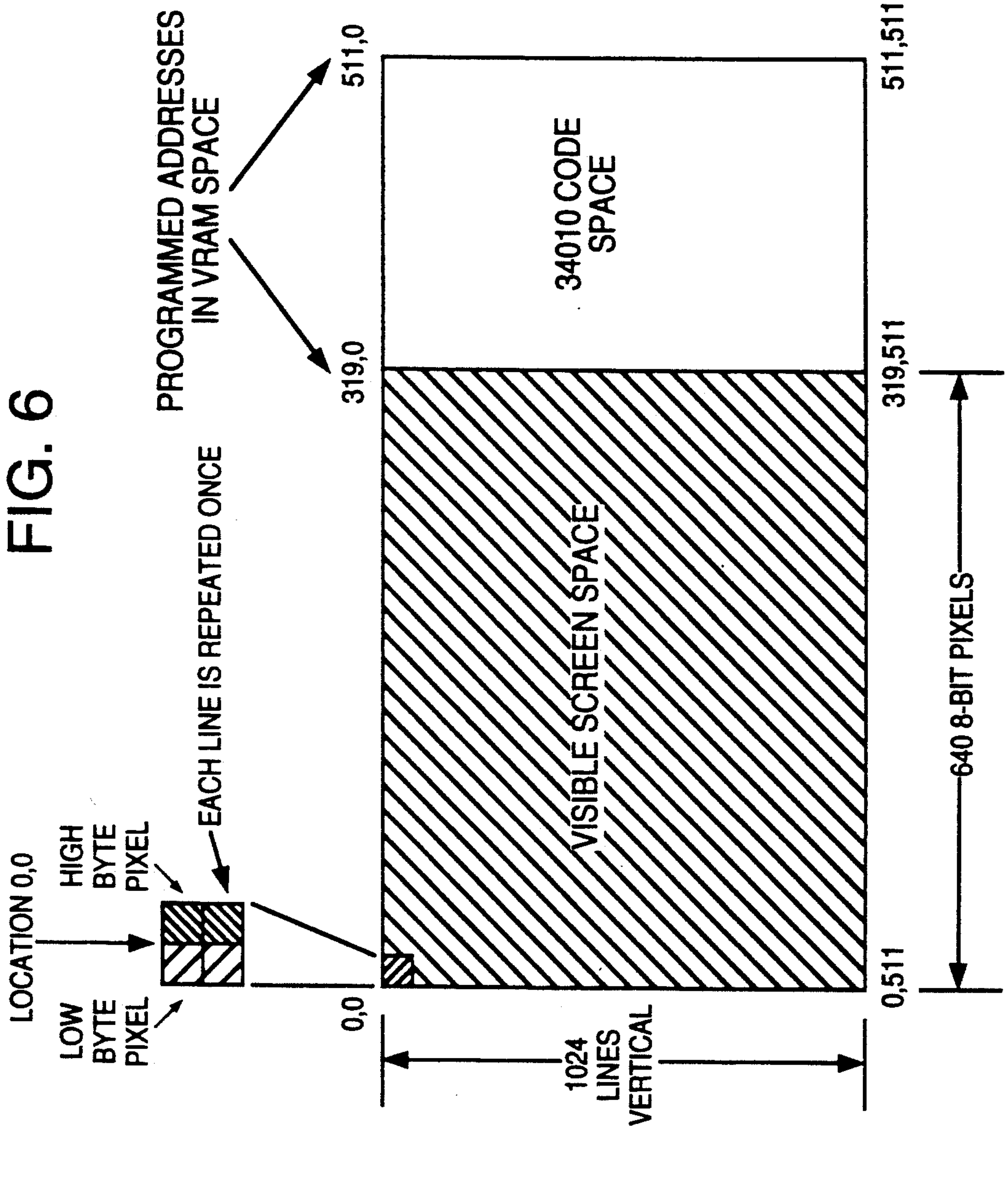
Figure 6A:
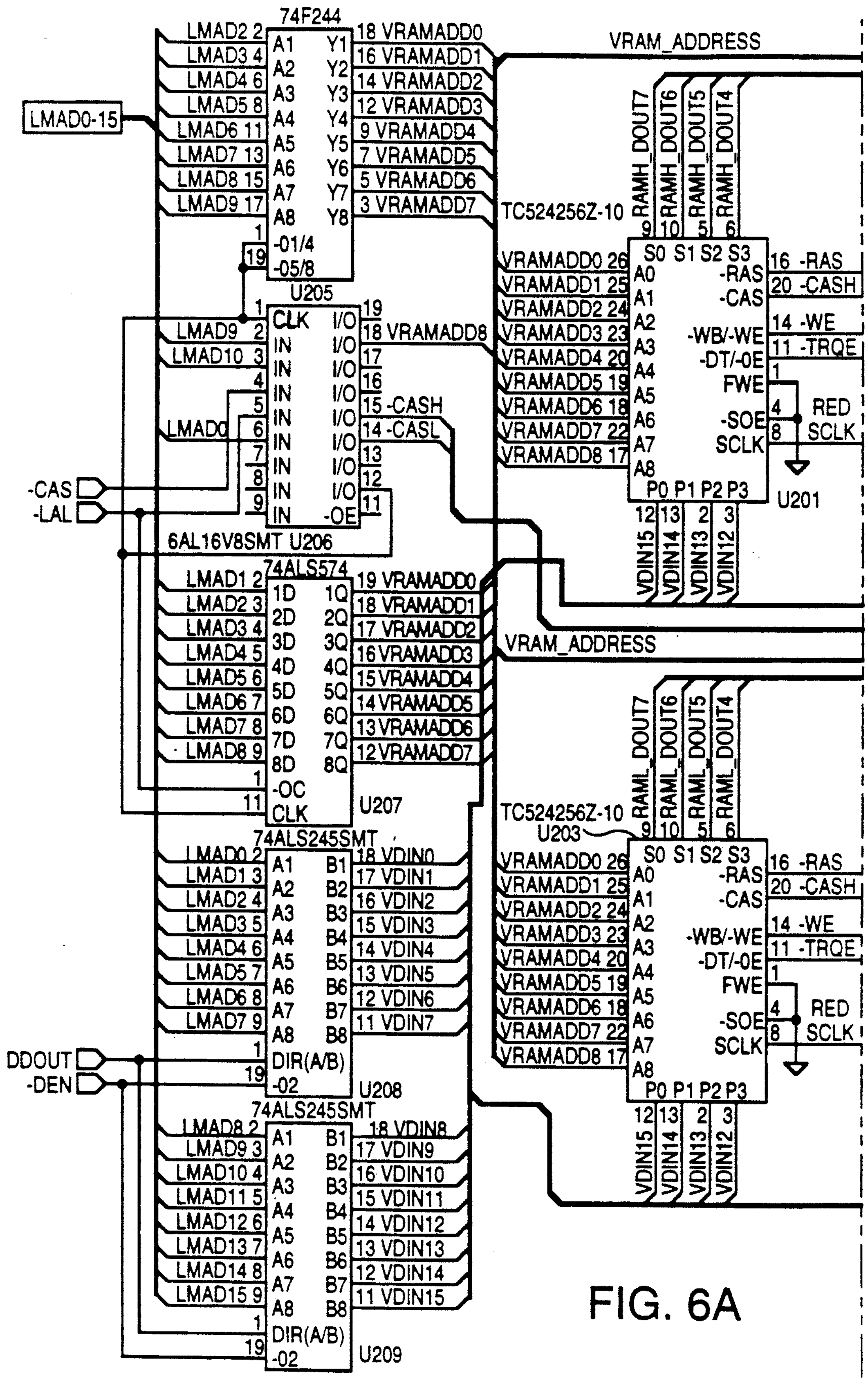
Figure 6B:
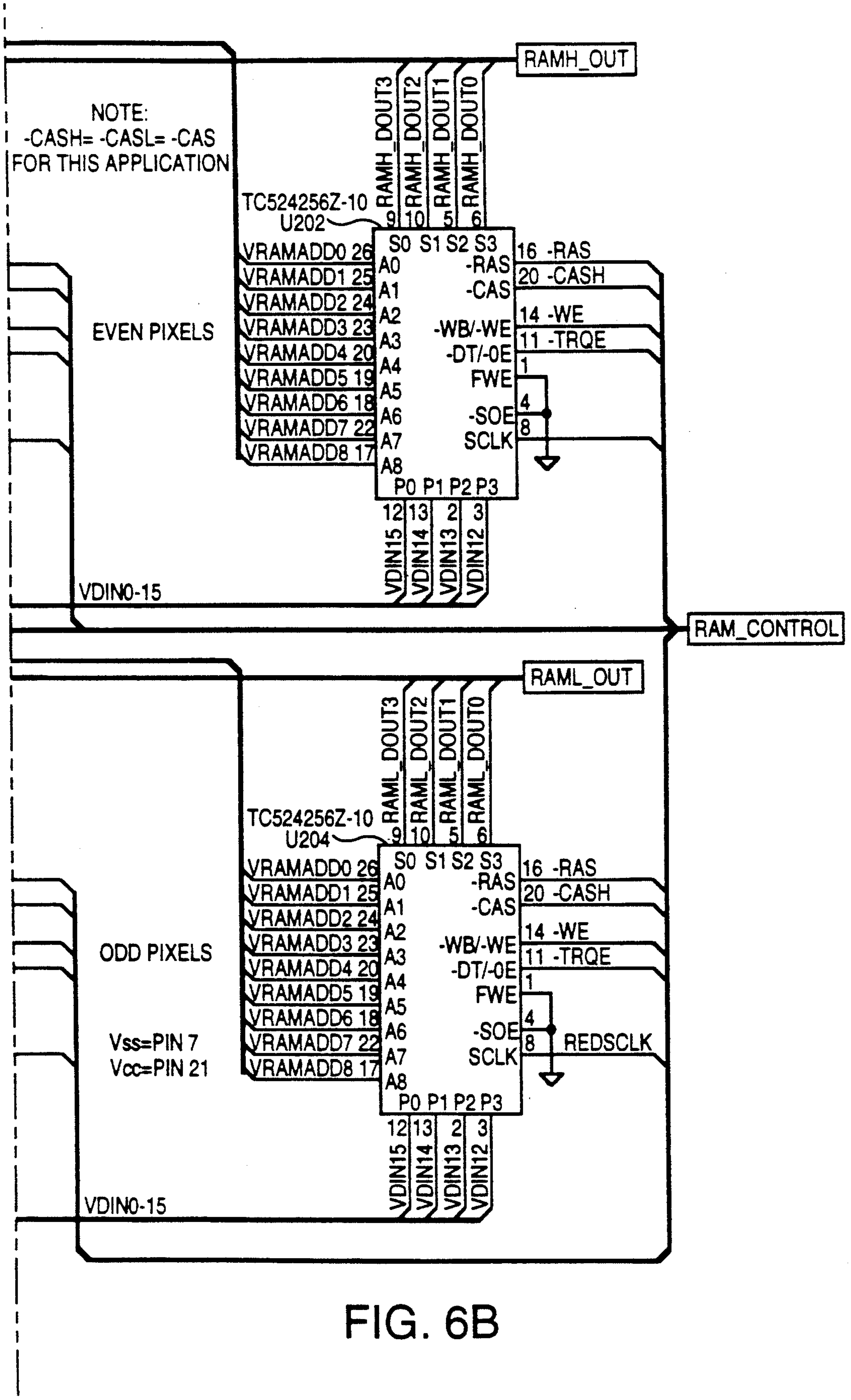
Figure 7A:
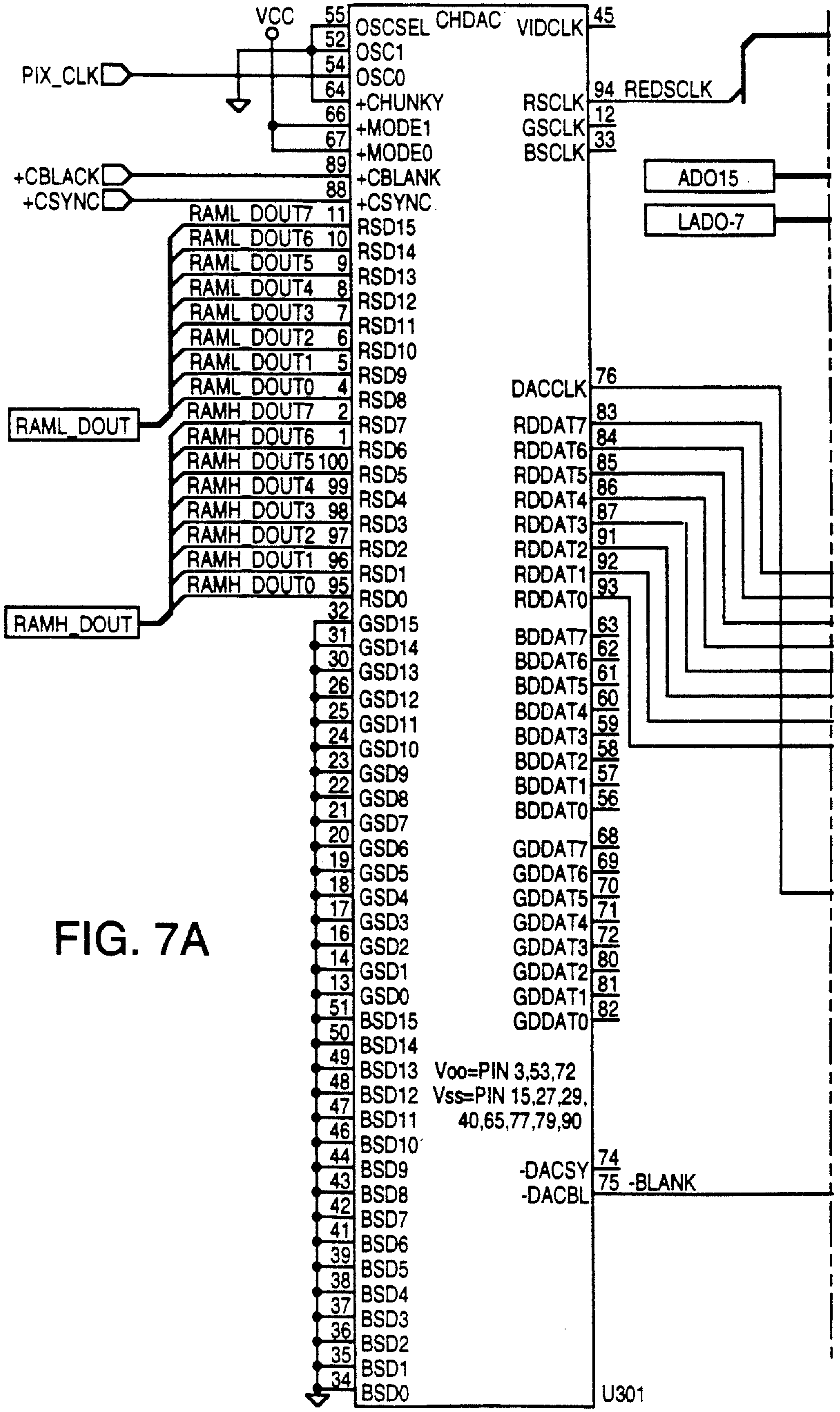
Figure 7B:
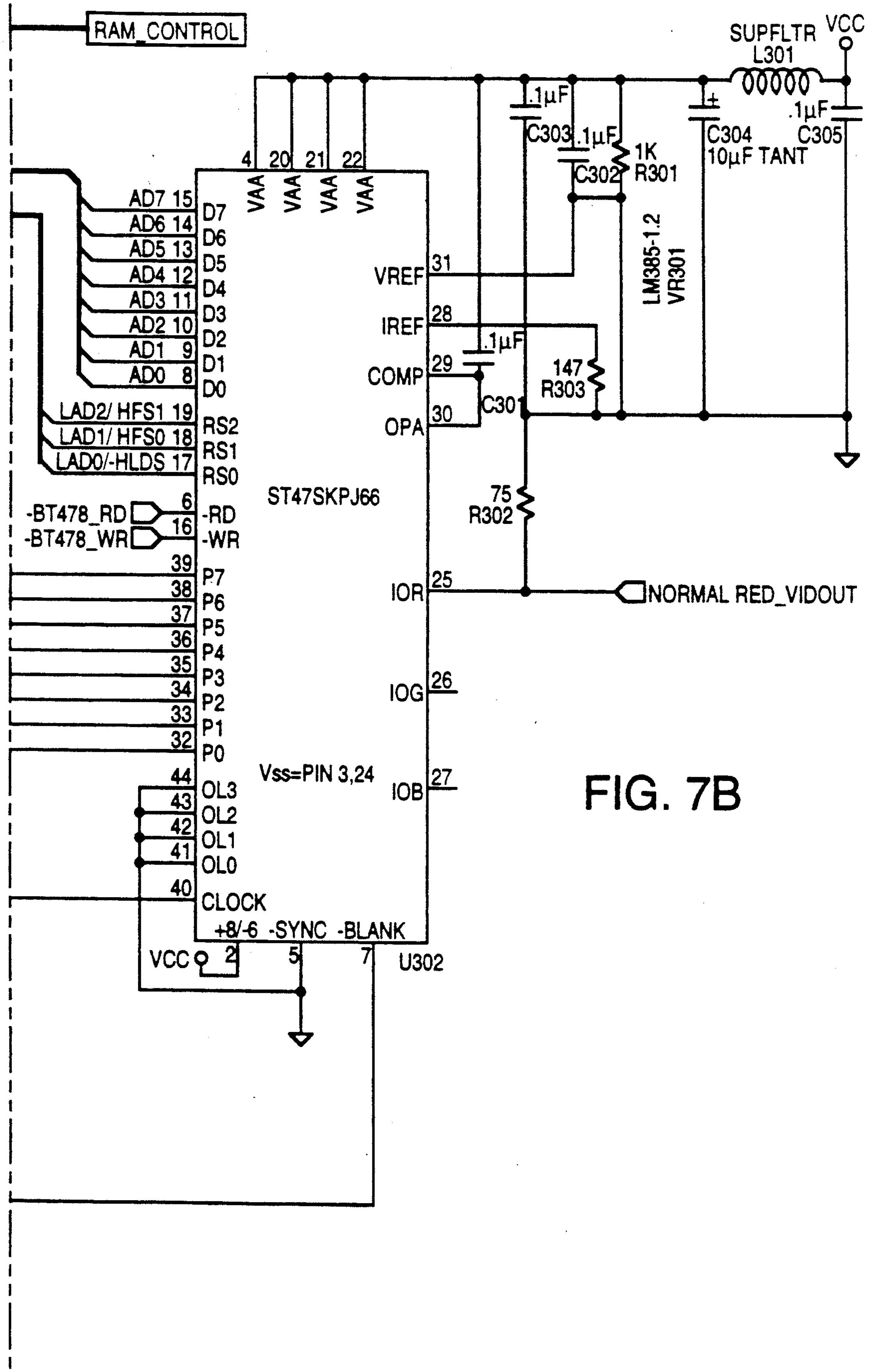

FIGS.5A, 5B, 6A, 6B, 7A, 7B, 8, 9A, 9B, 10A, 10B, 10C, 10D, 10E, 10F, 11A and 11B show schematically the video normalizer. FIGS. 5A and 5B show the pixel clock portion of block 34 of FIG. 2. FIGS. 6A and 6B show frame buffer 32 including four VRAM chips (U201, U202, U204, U204). FIGS. 7A and 7B show VREF correction circuit 38, including the BT478 (U302) and the "CHDAC" (U301) which is a demultiplexer, for unpacking the data output from the VRAM of frame buffer 32 from 16 bits to 8 bits, the even numbered pixels being provided on line RAM H_DOUT and then odd numbered pixels being provided or line RAML_DOUT.

Figure 8:
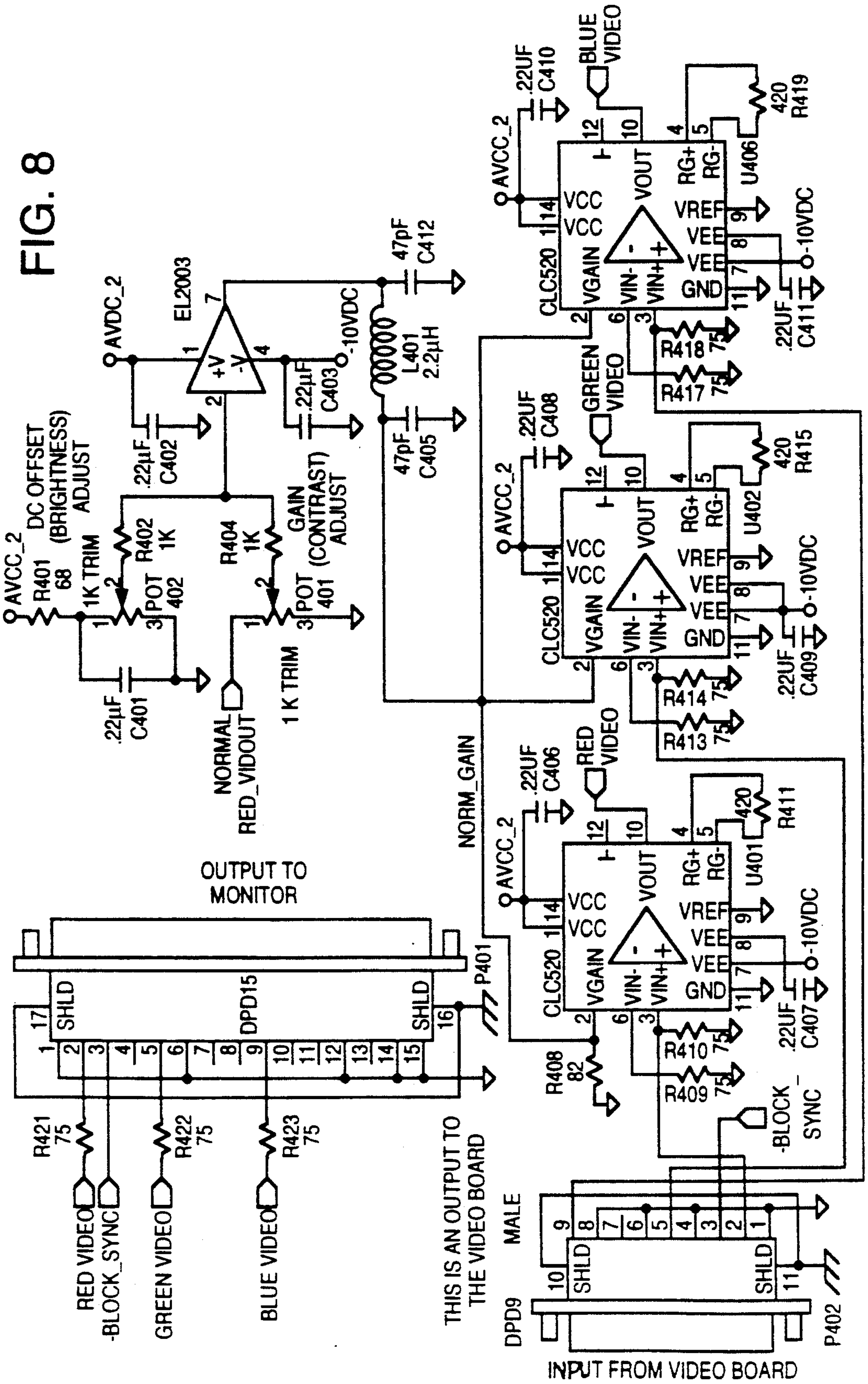

FIG. 8 shows (upper left) connector 50 (P401) and (lower left) connector 14 (P402). The zero adjust circuitry (right side of FIG. 8) is part of the VREF correction circuitry 38 for adjusting gain and offset of the correcting voltage. The transconduction amplifiers 28 are also shown, each designated as CLC520.

Figure 9A:
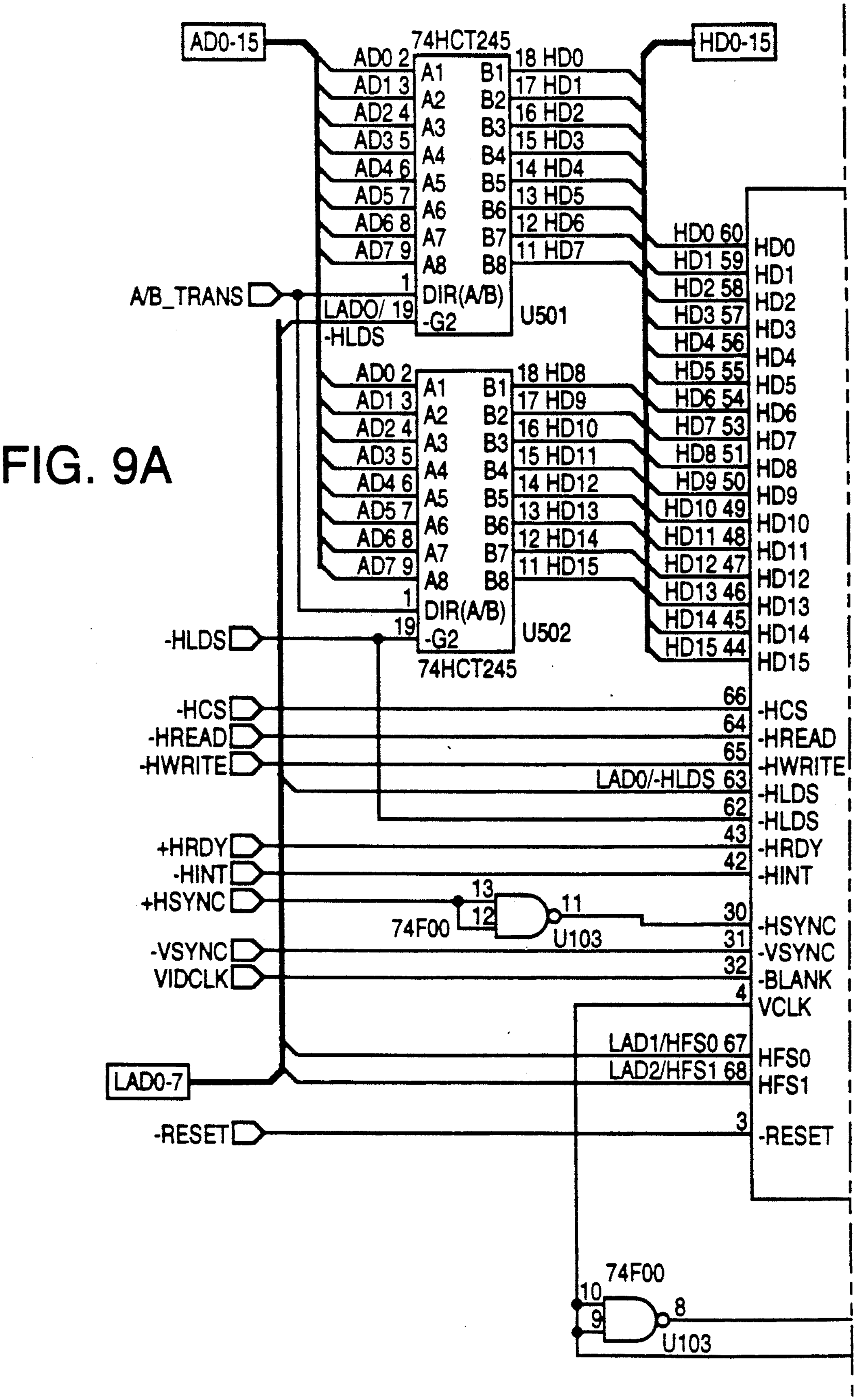
Figure 9B:
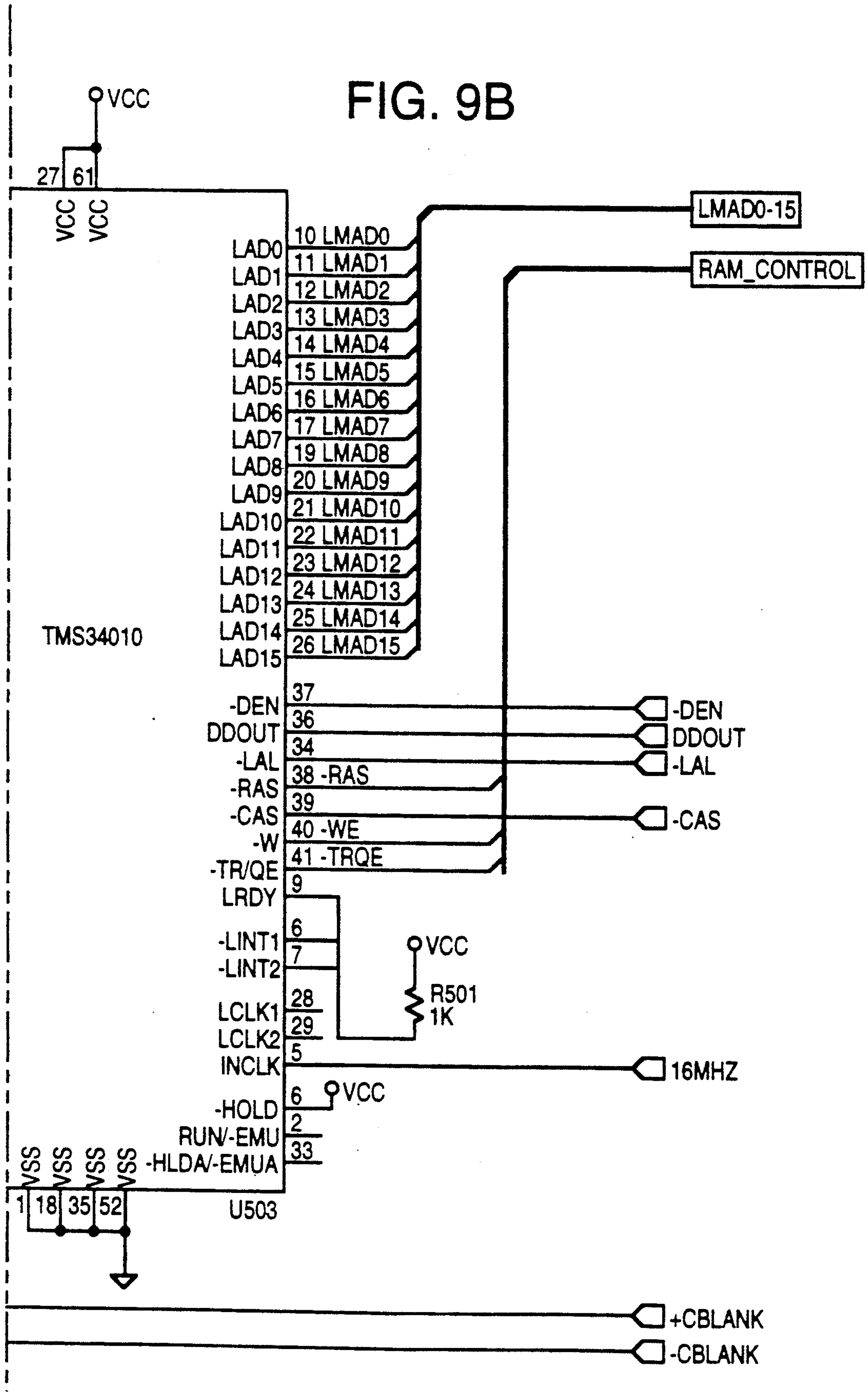
Figure 10A:
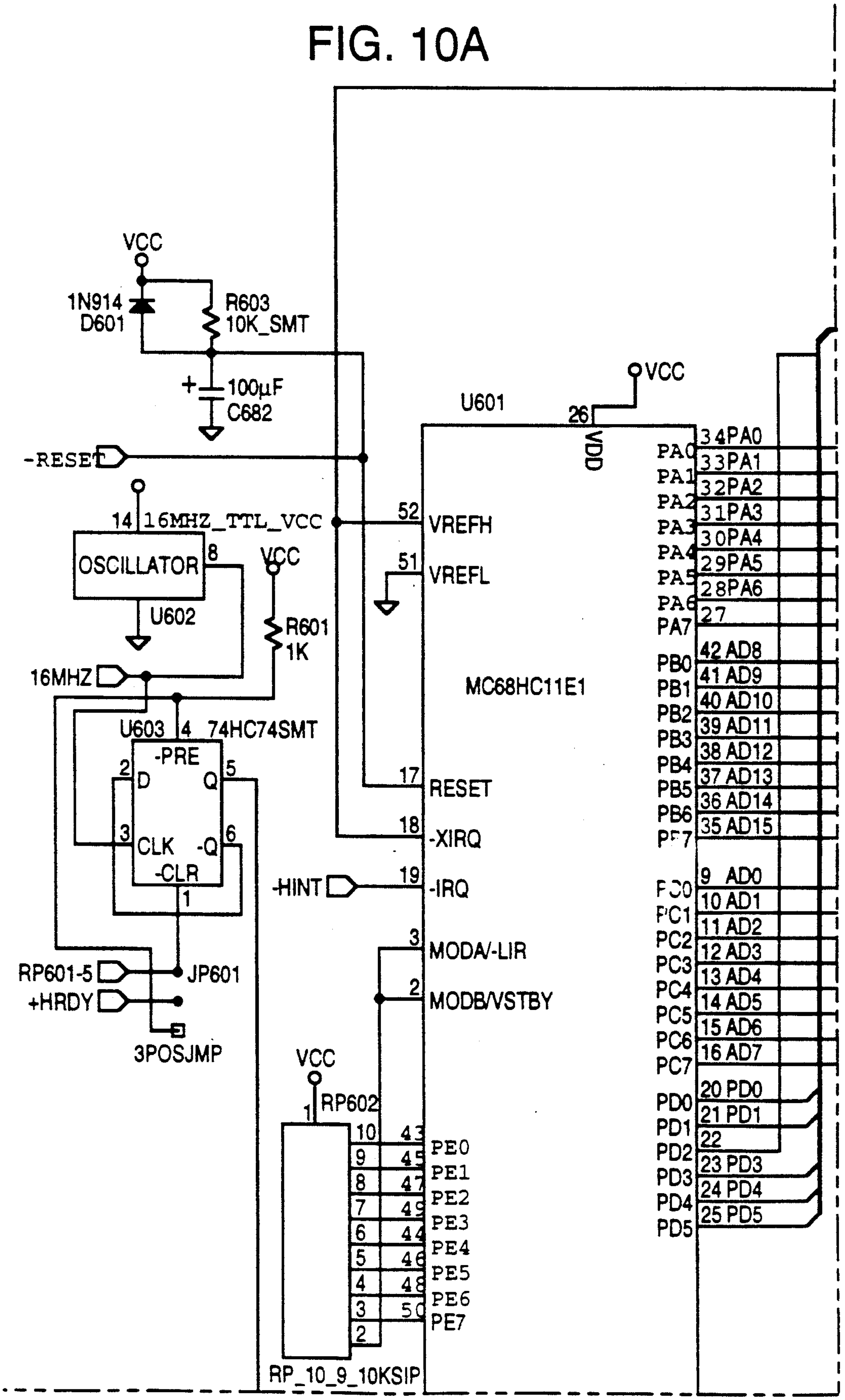
Figure 10B:
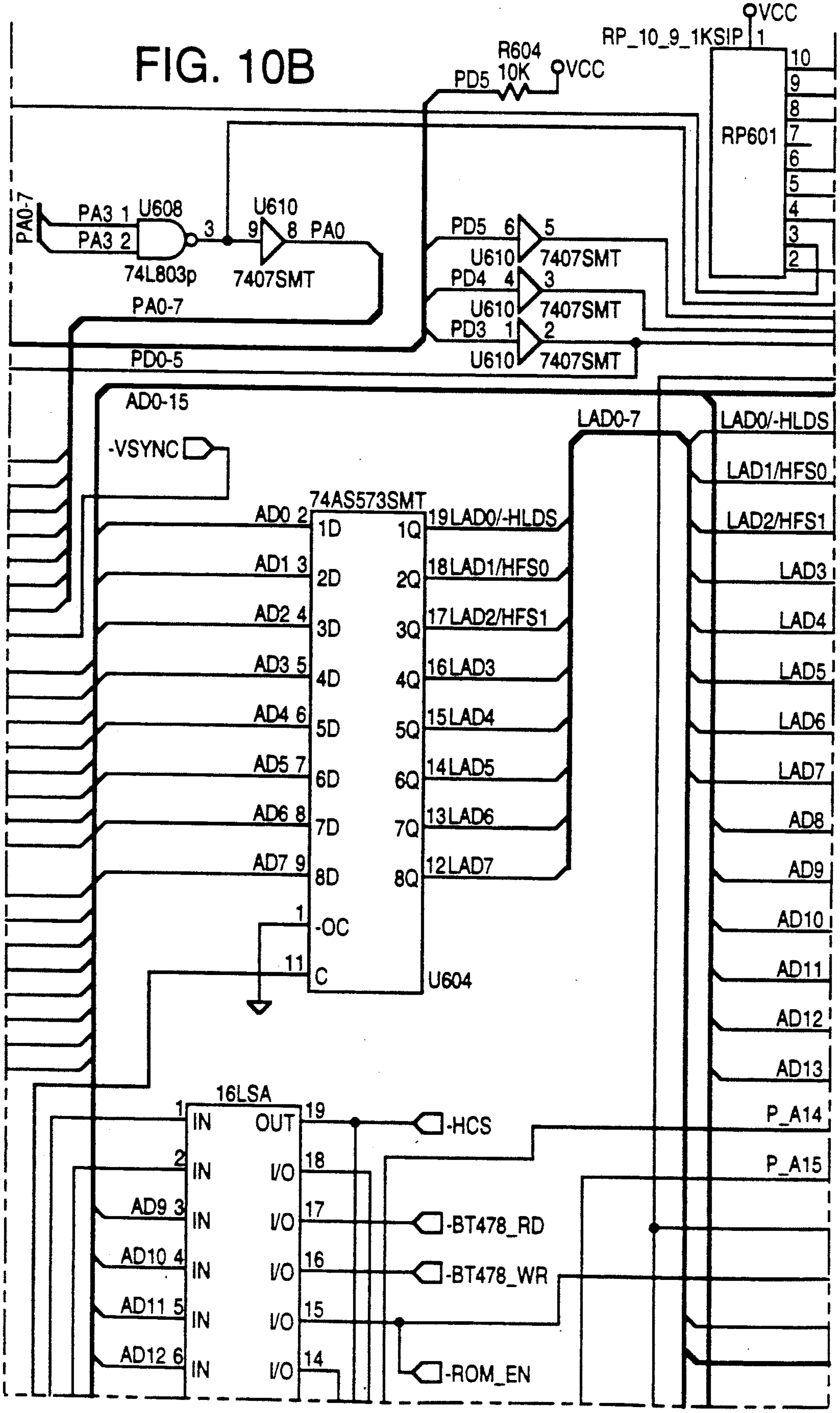
Figure 10C:
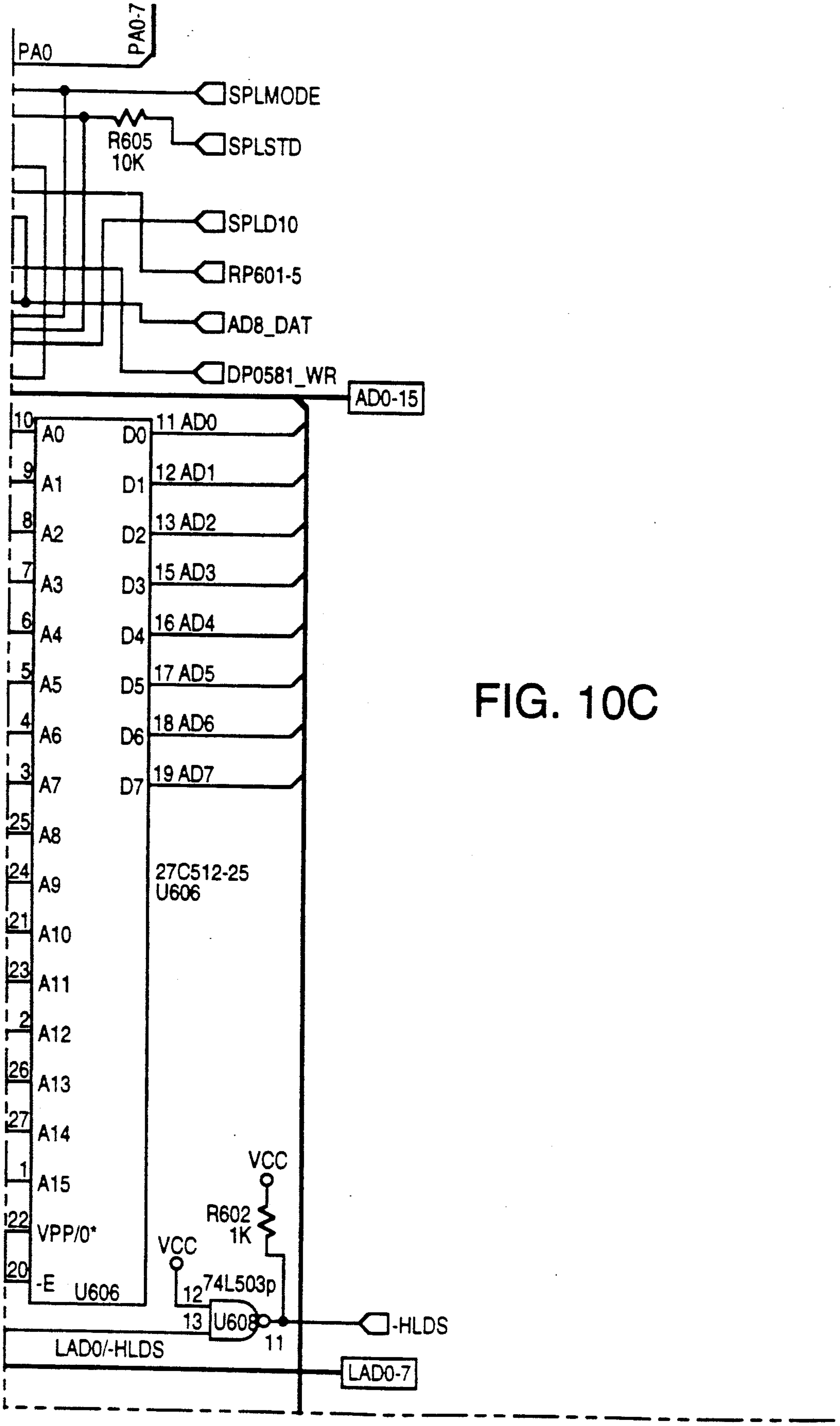
Figure 10D:
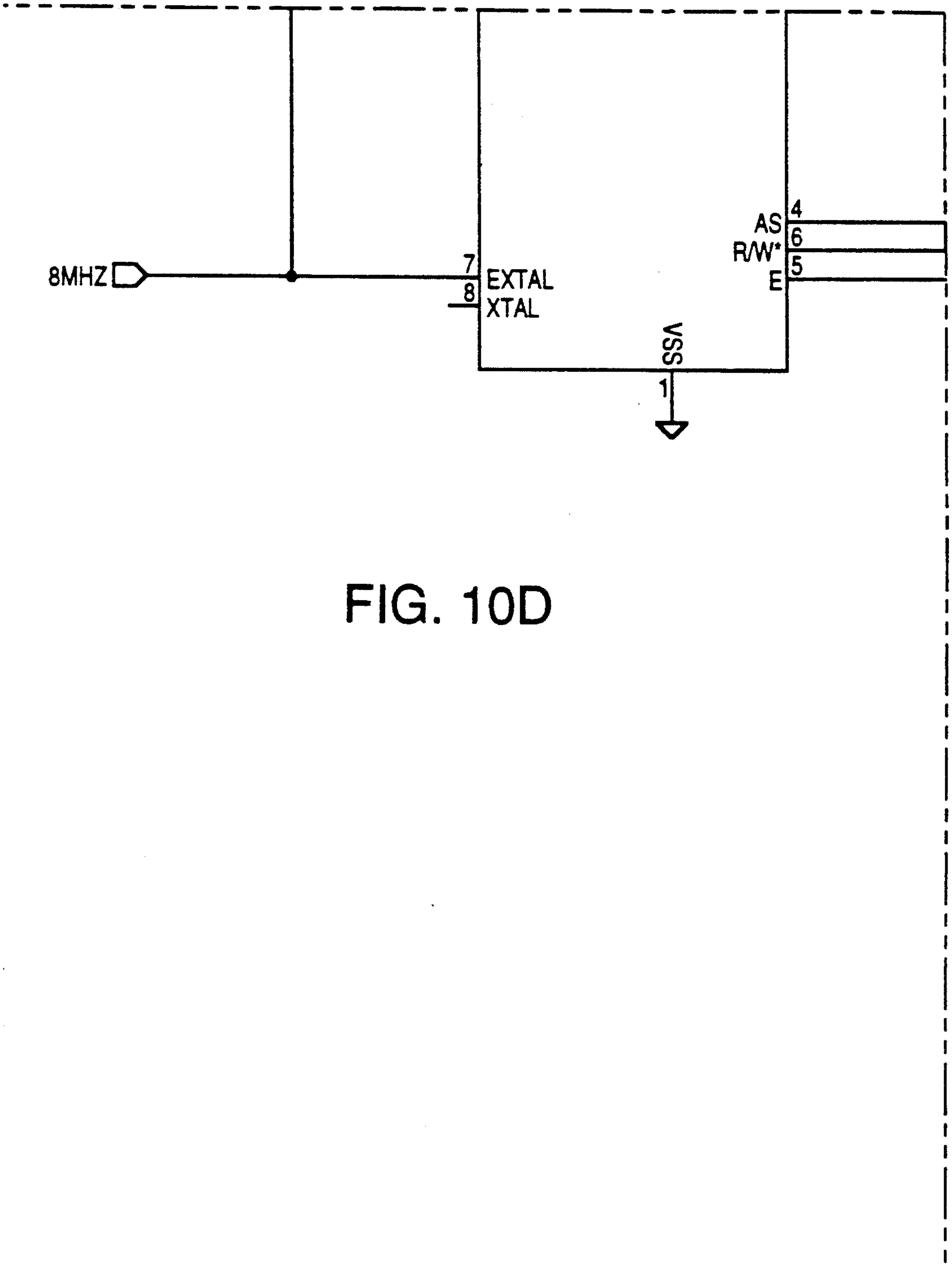
Figure 10E:
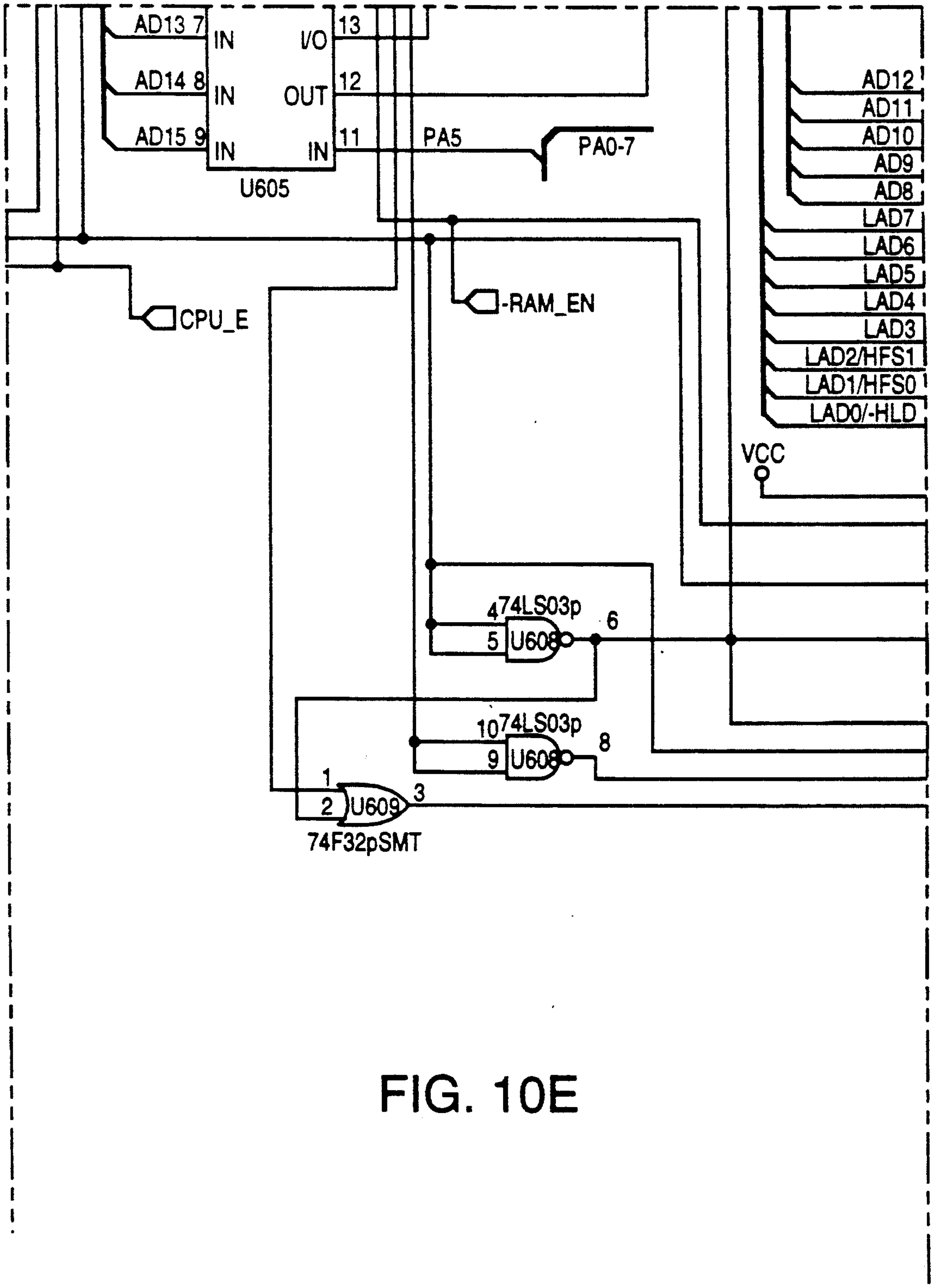
Figure 10F:
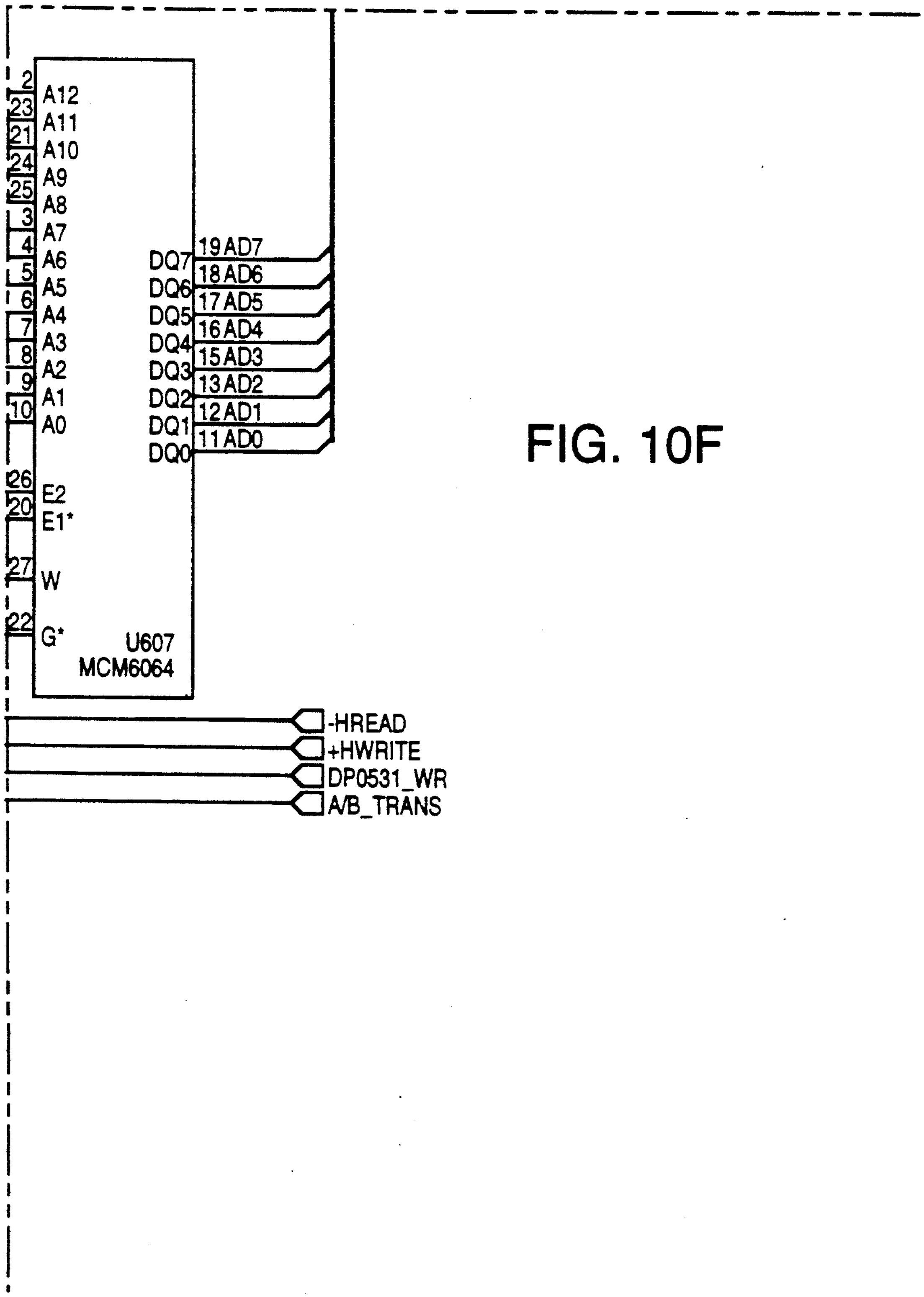
Figure 11A:
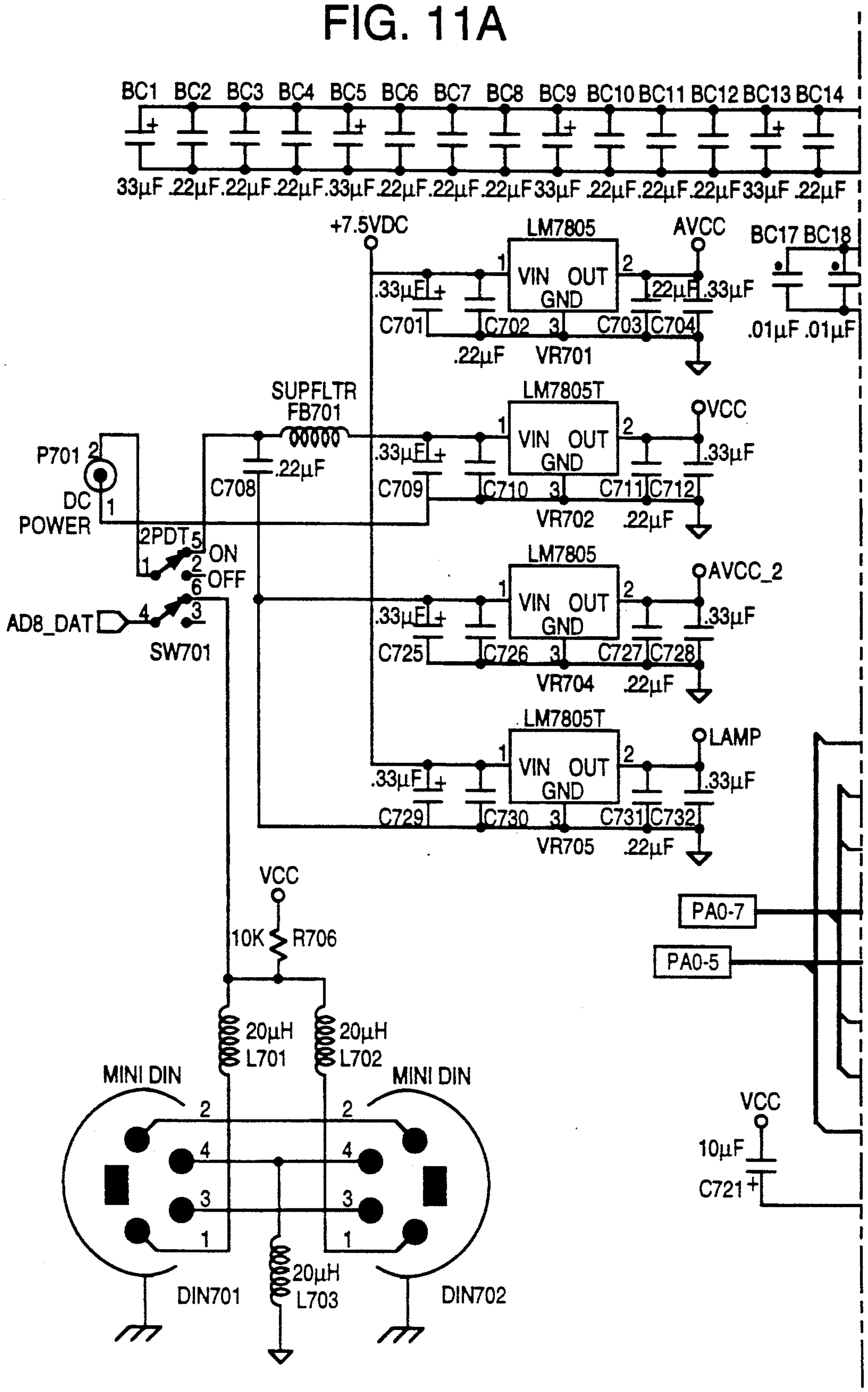
Figure 11B:
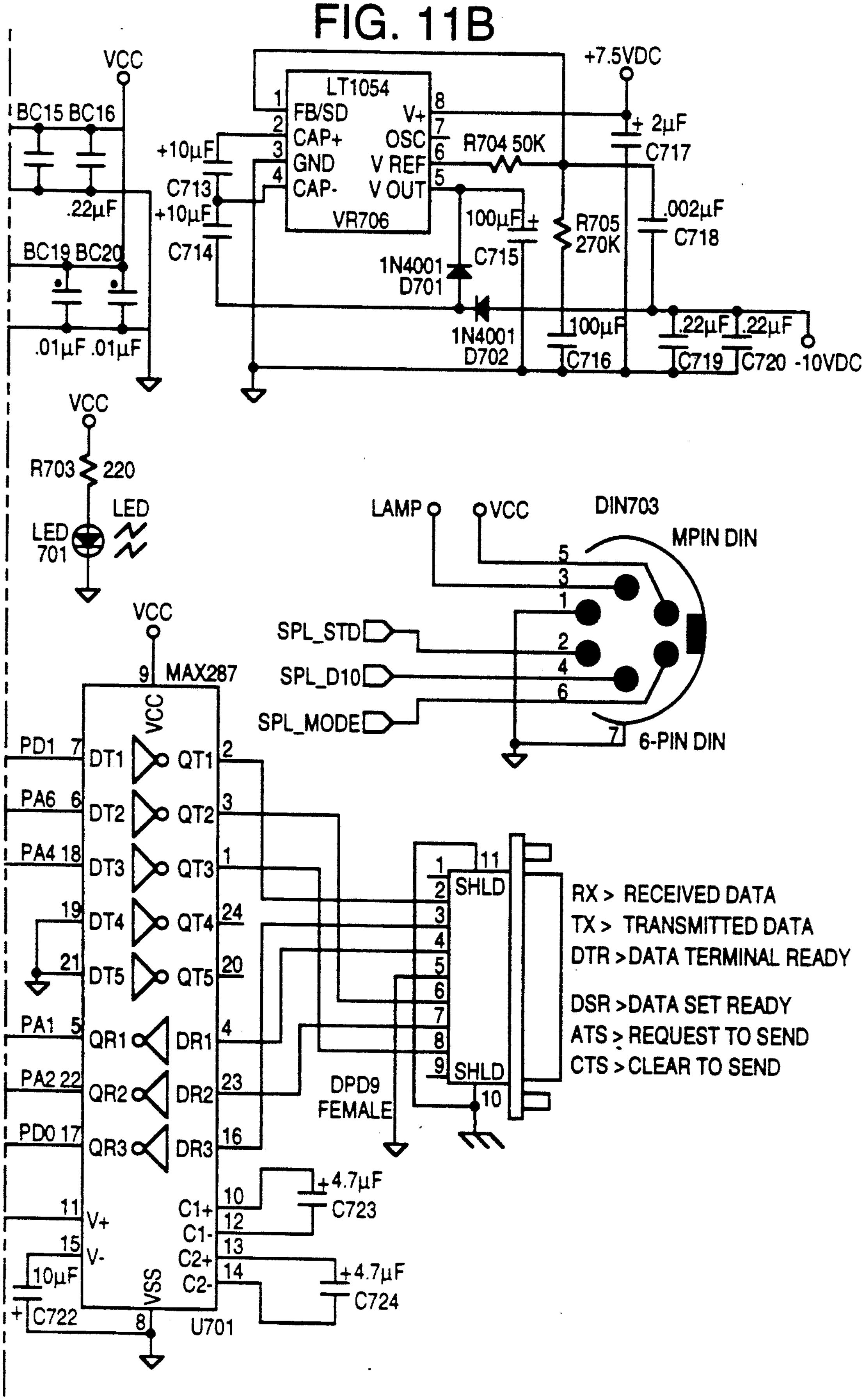

FIGS. 9A and 9B show (right side) the TMS34010 video processor (U503) of block 34, and associated circuitry. FIGS. 11A and 11B show the microprocessor 30 (U601), RAM 36 (U607), and ROM 40(U606).

FIGS. 11A and 11B show the ADB connectors (DIN701, DIN702) at the lower left to serial interface 20, the RS-232 connector (DSUB701), and the connection to power 26 and I/O connection 24 to the probe (DIN703). The remainder of FIGS. 10A through 10F are the power supply regulation (not shown in FIG. 2) for the video normalizer.

Figure 12:
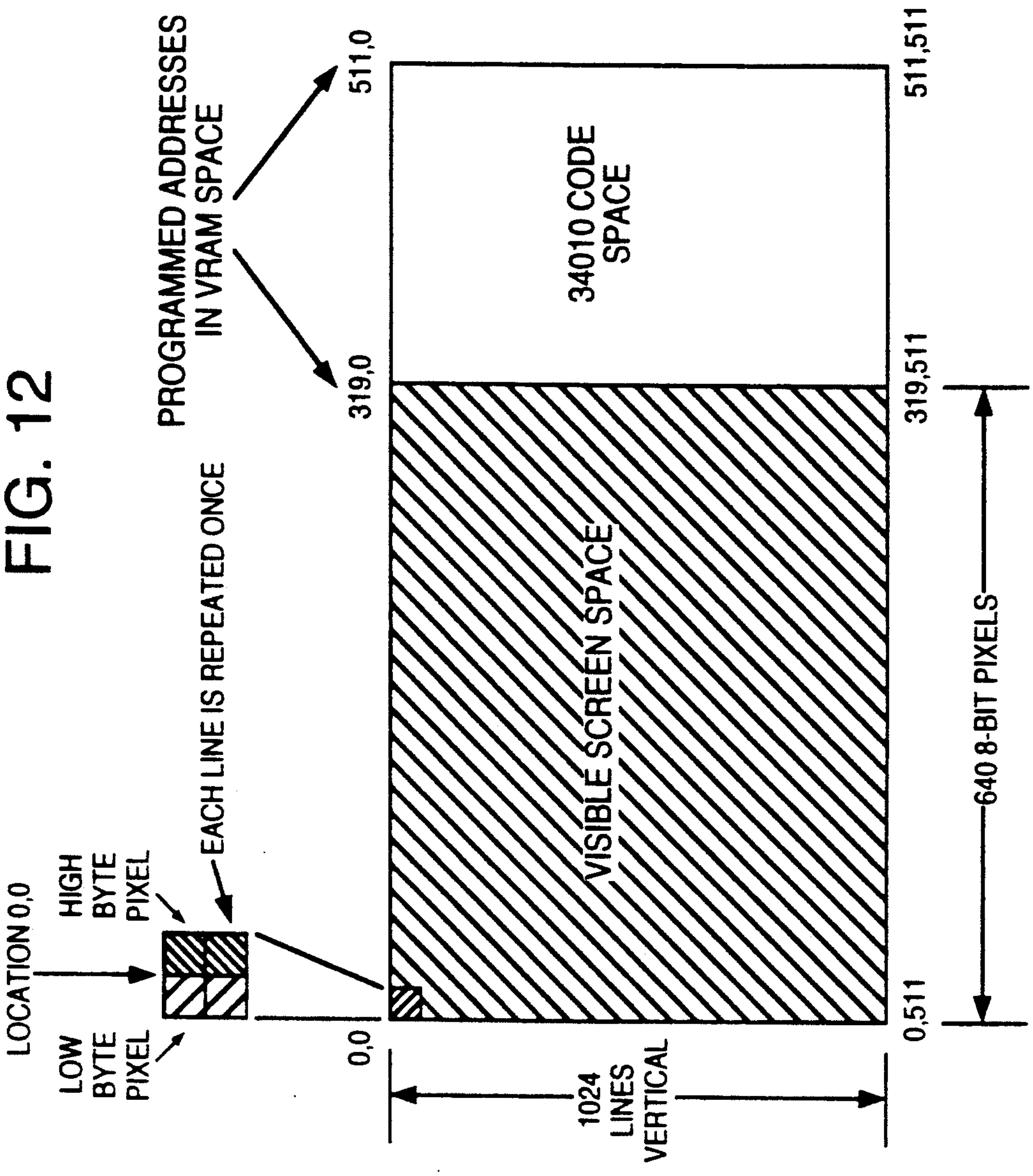
FIG. 12 shows video RAM structure of the video normalizer.

FIG. 12 shows diagrammatically the structure of the VRAM in frame buffer 32. As shown, there is a total of 512 addresses of column space with two 8-bit pixels per address. There is a total of 512 lines, each of which is repeated once for a total display of 1,024 lines. The VRAM structure includes (as described above) space allocated to the program code ("code space") for the TMS34010 video processor 34. This space is 512 rows by 192 columns.

In accordance with the invention, software (firmware) is installed in ROM 40 for execution on processor 30. This software includes a command set which is a flexible ASCII interface usable in a wide variety of hardware configurations. The command bet has the basic form of a command character followed by a numeric argument. Because the firmware is intended to operate over a wide range of types of processors 30, there are different classes of commands.

ROM Class 0 is the lowest level of commands. This class contains commands which pertain to data logging activity, but do not address the issues of formatting the output data in fixed units nor does it perform significant analysis on the data. ROM Class 1 contains the numeric capability to perform absolute unit conversions. All ROMs share the same Class 0 code.

The Identification code for a ROM version is of the form XX.XX.XX. The leading characters represent the ROM class. The middle characters represent the class 0 version number from which the new class was spawned. The last two characters represent the version number of the major class. ROM 40 is identified as Version 03.XX.XX. The leading 3 indicates the existence of the dimensional correction hardware. Because the video processor 34 code is stored in the same ROM 30 as the processor 30 code (see FIG. 3), it is desirable to conserve memory space in ROM 30. For this reason, the ROM 30 is based upon class 0 code with extensions. All unit conversion and floating point formatting are by the host computer 10.

These commands are independent of the hardware interface. Within the processor 30, the communications manager identifies a pending input, and places the input string into the command buffer. A command string is parsed when a CR/LF sequence (0×0D 0×0A) is encountered during transmission.

An individual command consists of an ASCII character followed by a number. A delimiter between commands can be a space. The commands terminate with a CR/LF sequence. The maximum string length which can be sent to the firmware is 64 characters including the CR/LF. Multiple strings can be sent.

The first command sent to the video normalizer is a "?~ (question mark) followed by a "0" (0×30) followed by a CR/LF sequence (0×0D 0×0A). This means "Send Status". The firmware will respond with a single byte status followed by a CR/LF. This byte will be an ASCII character. If the return is a 0×30 (ASCII 0), one can send a command or can request data. To request data one sends a "?" followed by a "1" (0×31), followed by a carriage return line feed.

The following describes the high level commands given by their letter designation and then the arguments which follow the command. The expected return action, if any, is also specified.

"?" Query commands

The Query commands are used to ask the firmware questions. The format of the command is a question mark followed by an ASCII number. In the descriptions which follow, the return values are shown.

Send Status "?0"

Return:

A single ASCII digit followed by a carriage return/line feed. The returned value corresponds to the following:

COMPLETE OK=0
DATA LOGGING=1
DATA LOGGING COMPLETE=2
SCALING DATA=3
ERROR=4
SETTING UP=5
FIRST USE=6
PARSING=7
WAITING TRIG=8

One does not send another command until status is COMPLETE OK. If one detects WAITING TRIG, it means that the measurement has not been updated since last requested that it be sent. If data is queried, the results will be identical.

Send ASCII DATA "?1" (Not available class 0 ROMS)

Return:

A string of four numbers, scaled as requested, in floating point notation, delimited by commas, and terminated with a carriage return/line feed sequence.

A typical string is:

"3.100e+001, 4.800e−003, 6.800e+003,1.809e+002CR/LF"

The strings which are sent by this command contain a blank before each number field. This space will contain a minus sign for negative values.

Send Error Code "?2-

Return:

See below for list of Error Codes

This is called only if one detects an error on a status check.

Send Version Number "?3"

Return:

This returns a string describing the EEPROM history and the copyright notice.

Send Pod Status "?4"

This function returns the condition of the probe 22 (pod) switch which is used to trigger the acquisition of data from the probe 22. This function is useful in applications which require physical knowledge of the position (i.e., on the monitor screen) or status of the probe 22. The ASCII value that is returned is a mask composed of the following values:

Gizzmo-SW1TCH=1
POD DOWN=2
LIGHT TRIGGER=4
RESERVED=8

This number is treated as a mask. The light trigger state will be based upon the lighting conditions. The signal RESERVED is always high. The probe 22 switch in one embodiment is a button on the side of the probe 22 for activating the probe 22. POD DOWN means that the probe 22 is in its support yoke (stand) and is being depressed down by the operator to take a reading of a photographic slide or other image.

Trigger a measurement via software "?5"

This function is used to trigger a measurement from software. In order for this to actually trigger a measurement, the trigger must be properly set (See Trigger Command T-). The trigger command "waits" until the entire trigger mask condition is satisfied. This means that the programmer must set precisely the mask for the actual measurement.

Query Measurement Header "?6" (binary)

The first two bytes returned by this function indicate the size of the measurement header. The Measurement Header structure returned is as follows:

| | |
|---|---|
| Measurement Mode | char |
| Collection Mode | char |
| Filter | char |
| Units | char |
| Collection Status | char |
| Trigger | char |
| Gain Type | char |
| Number of Sample Points | short |
| Period | short |
| GainlFilter 1] | short |

-continued

| | |
|---|---|
| Value[Filter 1] | short |
| Gain[Filter 2] | short |
| ValuelFilter 2] | short |
| GainlFilter 3] | short |
| ValuelFilter 3] | short |
| GainlFilter 4] | short |
| ValuelFilter 4] | short |

All shorts are returned in high byte, low byte format for a Motorola-type processor 30 and must be reversed for an Intel-type processor 30.

Query Raw Data "?7" (binary)

This function returns two bytes indicating the number of bytes to follow and the Gain and Data Value from the last measurement in a structure as follows:

GainlFilter 1] short
ValuelFilter 1] short
Gain[Filter 2] short
ValuelFilter 2] short
GainlFilter 3] short
ValuelFilter 3] short
GainlFilter 4] short
ValuelFilter 4] short Query EEPROM "?8"(binary)

This function returns the size followed by the contents of the 512 bytes of ROM 40

Low level commands

Before making a measurement, these factors are established:

a) What type of measurement?
b) How is data analyzed?
c) Which illumination system is required?
d) What units are to be used?
e) How is a measurement triggered?

The low level commands allow programming of custom environments. This environment is saved upon power down, but if the user changes modes manually, it is lost. As in the case of the higher level commands, the status should be checked periodically before sending each command.

The firmware maintains an internal data structure which describes how a measurement is to be made. The structure contains the following elements:

a) Measurement Type
b) Collection Mode
c) Filter Selection
d) Internal Lighting
e) Measurement Units
f) Status
g) Trigger Type
h) Gain Type
i) Number of points to collect
j) Time to wait between points Each of these parameters (except status) are modifiable by the programmer. For each parameter, the syntax of the command is an ASCII character (upper case) followed by an ASCII number. This allows one to send simple strings to the machine. Each command string is terminated with a carriage return line feed sequence.

"C" Data Collection Characteristics

Arguments:

| | |
|---|---|
| CONSTANT | O |
| PERIODIC | 1 |
| PULSED | 2 |
| NO CALC | 5 |

Return:

Check status

This defines how the data is acquired and analyzed after acquisition. The following table describes what is returned for each argument:

CONSTANT=Average of points set by "N" command

PERIODIC=Average of peaks found separated by the period specified by the period argument.

PULSED=the data is integrated over "N" points

NO CALC=Performs no scaling on the data. Valid only for Logger version of normalizer.

"S" Set Sample rate

Argument:

A number from 200 to 32,767.

This function determines the sample rate for the A/D converter 46. The number represents the number of "Tics" between samples. A Tic is 0.5 micro-secs. The minimum number of tics between samples is 200. The maximum is 32,767. The number of samples collected is set by the "N" command. The data is always acquired periodically. When sampling periodic sources, the period is set to an even multiple of the frequency under investigation.

"F" Set Color Filter channel to measure

Arguments:

| | |
|---|---|
| GREEN | O |
| BLUE | 1 |
| RED | 2 |
| BROAD BAND | 3 |
| ALL FILTERS | 4 |
| RGB | 5 |

Return:

Check Status for completion

In most situations, one selects all filters. To collect binary data, one selects a single filter for each acquisition. If one selects ALL FILTERS, one obtains the data for channel 4 when collecting binary data.

"L" Set Internal Lighting characteristics

Arguments:

| | |
|---|---|
| NO LIGHTS | 0 |
| TRANSMISSION | 1 |
| REFLECTION | 2 |

Return:

Check Status for completion

This function sets up the physical lighting conditions. If TRANSMISSION is selected, a light on the video normalizer probe 22 support stand will turn on. If REFLECTION is selected, the light on the probe 22 will turn on. (One embodiment of probe 22 includes a light source mounted on probe 22 to direct light onto the surface to be measured.) In the transmission case, the light in the probe 22 support stand will be dim. When a measurement is performed, the light becomes bright.

"T" Trigger Mode

Arguments:

| | |
|---|---|
| CONTINUOUS | 32 |

-continued

| | |
|---|---|
| CUSTOM PROG | 16 |
| EXTERNAL INPUT | 8 |
| SOFTWARE | 4 |
| POD IS DOWN | 2 |
| POD SWITCH DEPRESSED | 1 |

Return:

Check Status for completion

Every measurement is triggered by some occurrence. The arguments for this command represent a mask. For instance, if the normalizer is to trigger on the condition that the POD IS DOWN and that the POD SWITCH IS DEPRESSED, one sends an ASCII "3" as an argument. A measurement would not occur until this condition was detected in the instrument. So, one "or's" the mask conditions and the measurement occurs when this mask is equal to the current trigger. EXTERNAL INPUT means that the normalizer will wait for the External trigger pin to go low (edge triggered, downward going).

CUSTOM PROG indicates that the trigger has been programmed. This could mean that the video normalizer must send a trigger before making a measurement.

The firmware is event driven. There is an event loop which checks activity throughout the machine to see what's going on. If an event has occurred, then the loop sets an event bit, and a task is launched to satisfy the event. The event loop is quite quick. Triggers have a "life time". This prevents false triggering and a trigger is in all cases except "CONTINUOUS" a sporadic event The mask which is listed above is in order of life time. A CONTINUOUS trigger is only cleared by changing the value through software. CUSTOM PROG, EXTERNAL INPUT, and SOFTWARE triggers are cleared only after the complete trigger mask has been satisfied. If the programmer wishes to collect a data point after the user presses the switch on the probe 22 and the probe 22 is in the "down" position on its stand, the trigger should be set to SOFTWARE¦POD_IS_DOWN¦POD_SWITCH_DEPRESSED. The program the⁴sends down request for data ("?1"). A data point is sent when both the probe 22 switch and pod-down switch are actuated. Note that after the data point is taken, the entire trigger will be cleared. The programmer resets the trigger mask before taking the next point. If the user puts the probe 22 down, but does not hit the probe 22 switch, no data will be sent.

"G" Set Gain manually on current channel

Arguments:

| | |
|---|---|
| AUTO GAIN | 0 |
| CAL GAIN | 1 |
| LAST GAIN | 2 |
| MANUAL GAIN | 3 |

Return:

Check status for completion

The Auto Gain function makes a large number of measurements and can often take a while to complete. It is used in all of the pre-programmed modes because it avoids quantization effects. If the user is making repeated measurements of a fixed source, one uses the LAST GAIN argument for further measurements after the first. Auto-Gain sets the gain for all channels. Manual Gain will only set the channel that is specified by the ~F" command. CAL GAIN utilizes the gain that was used during light calibration. It is useful only in the modes which use probe 22 internal illumination (i.e., a light source in probe 22).

REF GAIN utilizes the gain used to acquire the reference color. This mode is for precise, repeatable difference measurements, in QC applications which require consistent measurement of a single color.

"N" set number of points to acquire

This function sets the number of points to acquire for a sample acquisition. The minimum number of points is 16, the maximum number of points is 2048. To the FFT (Fast Fourier Transform) facility within the host computer 10, one sets this number to a power of two points and not greater than 1281.

Binary Data Functions

"E" Set EEPROM constant

Argument

<ASCII EEPROM address offset (decimal)> <ASCII data value 0-255>

Return

Check status on return from function

This is to set specific bytes in EEPROM.

"B" Get Binary Data burst on current channel (binary)

Arguments: None

Return

The first two bytes returned indicate the number of bytes to follow. The data is sent in high-byte, low-byte format (for a Motorola-type processor 30). This function returns the contents of the last burst buffer for a single channel. A user must first trigger a measurement, then collect the data.

"!" Master Reset to state 0

Arguments:

None

This function resets the video normalizer. It does not require a carriage return line feed. It forces a write to the EEPROM. There is no need to routinely send a reset.

ERROR CODES FOR FIRMWARE

When an error occurs, the error number is displayed on the top line of the display. When remotely programming, a "?2" command will return the error condition. The last error code is stored until it is read by the host computer 10.

0 NO ERROR.

-1 UNKNOWN ERROR.

-2 BAD COMMAND. An error in a remote programming string was found.

-4 BAD EEPROM STRING. The EEPROM offset parameter was incorrect.

-7 SATURATION ERROR. The target that the video normalizer is trying to measure is too bright to measure.

-9 SET COLLECTION BAD PARAMETER. The remote program string contain an invalid collection parameter.

-10 SET MEASUREMENT BAD PARAMETER.

-11 SET UNITS BAD PARAMETER.

-12 QUERY BAD PARAMETER.

-13 SET FILTER BAD PARAMETER.

-14 SET LAMPS BAD PARAMETER.

-15 SET GAIN BAD PARAMETER.

-16 SET SAMPLE RATE BAD PARAMETER.

-17 SET NUM BURST BAD PARAMETER.

-18 SET GAIN BAD PARAMETER.

-19 SET TRIGGER BAD PARAMETER.

-20 BAD EEPROM BYTE. The value to be programmed into EEPROM was greater than 255.

-21 EXT TRIGGER BAD PARAMETER.

-22 ALT FUNC BAD PARAMETER.

-26 BAD EEPROM ADDRESS. The offset parameter produced an incorrect EEPROM address.

-28 FUNCTION NOT IMPLEMENTED. This function has either not yet been implemented or is not available in this version.

ROM COMMANDS

| | Command List for programmable interfaces | | | | |
|---|---|---|---|---|---|
| Command | Argument | Name | Class O | Class 1 | Class 2 |
| ? | 0 | Query Status | x | x | x |
| | | " ASCII data NA | x | x | |
| | 2 | " Error code | x | x | x |
| | 3 | " Version # | x | x | x |
| | 4 | " Pod Status x | x | x | |
| | 5 | " Soft Trigger | x | x | x |
| | 6 | " Meas. Head. | x | x | x |
| | 7 | " Raw Data | x | x | x |
| | 8 | " EEPROM | x | x | x |
| | 9 | " Pod Type | x | x | NA |
| M | O | Trans Dens | NA | x | x |
| | 1 | Trans Dot | NA | x | x |
| | 2 | Ref Dens | NA | x | x |
| | 3 | Ref Dot | NA | x | x |
| | 4 | Mon Lum. | NA | x | x |
| | 5 | Custom | NA | x | x |
| | 6 | Luminance | NA | x | x |
| | 7 | Illuminance | NA | x | x |
| C | O | Constant | x | x | x |
| | 1 | Periodic | x | x | x |
| | 2 | Pulsed | x | x | x |
| | 3 | RMS | NA | x | x |
| | 4 | FFT | NA | x | x |
| | 5 | No Calc | x | NA | NA |
| S | ntics | Sample Rate | x | x | x |
| F | O | Green Channel | x | x | x |
| | 1 | Blue | x | x | x |
| | 2 | Red | x | x | x |
| | 3 | Broad_Band | x | x | x |
| | 4 | All_Filters | x | x | x |
| | 5 | RGB | x | x | x |
| L | O | No Lamps | x | x | x |
| | 1 | Transmission | x | x | x |
| | 2 | Reflection | x | x | x |
| U | O | Raw Data | NA | x | x |
| | 1 | Density | NA | x | x |
| | 2 | Percent_dot | NA | x | x |
| | 3 | CIE_Luv | NA | x | x |
| | 4 | CIE_Yxy | NA | x | x |
| | 5 | CIE_LUV | NA | x | x |
| | 6 | CIE_Lab | NA | x | x |
| | 7 | TEK_HVC | NA | x | x |
| | 8 | Gizzmos | NA | x | x |
| T | 32 | Continuous | x | x | x |
| | 16 | Custom Prog | x | x | x |
| | 8 | External Input | x | x | x |
| | 4 | Software Req | x | x | x |
| | 2* | Pod Down | x | x | x |
| | 1 | Pod Switch Depr. | x | x | x |
| G | O | Auto Gain | x | x | x |
| | 1 | Cal_Gain | x | x | x |
| | 2 | Last_Gain | x | x | x |
| | 3 | MANUAL GAIN | x | x | x |
| N | npts | Num points | x | x | x |
| A | O | Dark Current | NA | x | x |
| | 1 | Dark Cal | NA | x | x |
| | 2 | Light Cal | NA | x | x |
| | 3 | Monitor Freq | NA | x | x |
| | 7 | Exit Alt | NA | x | x |
| E | args | Set EEPROM | x | x | x |
| B | none | Get Binary | x | x | x |
| P | string | Display String | NA | NA | x |
| ! | none | Master Reset | x | x | x |
| X | <string> | External Trig | x | x | x |

2.2 New Query Extensions

The Query command (?) obtains information and status from the video normalizer.

2.2.1 GetPodID (?10)

This function queries probe 22 for the pod description header. The pod description header contains information that describes the hardware capability of the probe. The actual content of the header is described below.

2.2.2 GetCalConstants (?11)

This function gets the scaling constants for absolute color measurement. These are four bytes of data which are used to scale the individual filter curves to an absolute scale.

2.2.3 GetPodSpectralResponse (?12)

This function obtains the normalized spectral response of the probe 22. The normalized spectral response is stored as an array of 81 bytes per color (Red, Green, Blue and WideBand). These points are the normalized spectral response (O×FF=1.0) of the probe 22 in the visible region from 380 to 780 nm (5 nm increments). There are a total of 324 bytes of spectral data (4*81). The absolute filter data is obtained when these spectra are multiplied by their corresponding scalars.

2.3 Command Extensions and new function calls in the 68HC11 Processor

The video normalizer circuitry requires an additional set of commands for hardware specific functions.

2.3.1 InitVideoConstants (RO<which setup>)

This command is sent down to initialize a monitor type. The value of the variable "which setup" will be from 0 to 4. These values have the following meaning:

0=CUSTOMCONF1G
1=1280×1024
2=1152×900
3=1024×768
4=1152×870

This command will trigger the function:

void InitVideoConstants (VideoStruct *VideoSetUp)

This function is used to initialize the video constants on the VSC 34. The data resister values are programmed as an image in processor 30 ROM. Optionally, the VideoStruct can be downloaded from the host computer 10. The command parser will fill the VideoStruct with the appropriate data and pass this to this function.

2.3.2 InitClockConstants R1<which_setup>

This command is sent down to initialize a monitor type. The value of the variable "which setup" will be from 0 to 4. These values have the following meaning:

0=CUSTOMCONFIG
1=1280×1024
2=1152×900
3=1024×768
4=1152×870

This command:will trigger the function:

void InitClockConstants(ClockStruct~Clock SetUp)

This function is used to initialize the clock controller chip. The clock controller chip constants are stored as an image in the processor 30 ROM, or may be optionally downloaded from the host processor. The command parser will fill the ClockStruct with the appropriate data and pass it to this function.

2.3.3 StoreMeasurementArray (R2<size rows> <size cols> <rows*cols*2 values>) void StoreMeasurementArray(int * array, int size rows, int size cols)

The measurement array is downloaded from the host computer 10 and stored in EEPROM in the processor 30. This data is used by the video processor 34 to calculate the correction function for the display system. This data is downloaded, along with the video processor 34 code, to the video processor 34 from the processor 30 on powerup.

2.3.4 DoCorrection (R4)

void DoCorrection (char~ CodePtr, short nbytes, short ~array, short data)

This function physically downloads the code and the required data to the video processor 34. The processor 30 will typically execute this function as part of the powerup sequence. DoCorrection will be executed each time StoreMeasurmentArray is executed.

2.3.5 InltRamDac (RS)

This command will cause the DAC in frame buffer 32 to be initialized with a linear LookUp Table.

void InitRamDac(void)

This function initializes the BT478 RAMDAC. It loads the Look Up Tables with a linear ramp.

2.3.6 DownLoadProgram (R6)

This function initiates a download of the correction code (program) from the host computer 10 to the processor 30 and then down to the video processor 34. It is called from the Video Parser (see below) and it allows for fixes or enhancements to be included by-passing the ROM 40 code. This function is executed through the Video Parser and it overrides the video processor 34 code stored in the ROM 40. This function copies a byte from the host computer 10 into an incremented memory location in the video processor 34 address space. It acts as a simple communications interface for the video processor 34 and allows an update to occur. It then calls the DoCorrection command with Codeptr variable set=0 and nbytes=0. The measurement array is then sent to the video processor 34 and the correction is calculated.

3.0 TMS34010 video processor commands/program 3.1 VideoProcessorlnit

This function performs the basic initialization of the video processor 34; the function may be performed primarily by the processor 30.

3.2 QuickfillAll

QuickFillAII will set the correction memory to full scale brightness. This will be initiated immediately before performing the correction.

3.3 GetMeasurementData

Upon query from the processor 30, the GetMeasurementFunction allocates memory for the measurement array and it returns the address in GSP memory space to place the data.

3.4 DoCorrection

This function executes the correction algorithm for the video subsystem. The algorithm may be a linear interpolation or least squares fit of the 2 dimensional surface.

3.5 VideoParser

This is a small event loop which is continuously run in the video processor 34. The event looks at the host 10 data register for an event command. If the command word hasn't changed, it simply looks at the register again. When the command word changes, the command is "looked-up" through a table of valid commands. If the command is valid, the corresponding function is executed. If the command is invalid, the video processor 34 puts an error code in the Host-Data Register. An error is reported back to the host computer 10 via the processor error reporting mechanism. There are three valid commands: QuickFillAll, DoCorrection, GetMeasurementData.

4.0 User Application Program 4.1 Purpose and Scope

The application software supports the monitor calibration activities and basic reflection, transmission and luminance measurement. The video normalizer has other uses such as calibration of scanner input, calibration of output devices (such as printers and typesetters), color calibration, and process control.

4.2 Monitor Gamma Measurement

Monitor gamma correction consists of measuring the output luminance of the monitor 19 as a function of input value and then calculating an inverse look up table to perform the monitor 19 correction (linearization).

Accurate measurement of the monitor's 19 luminance requires conversion of the video normalizer's view of the monitor 19, which is as a rapidly pulsating light source, into units proportional to the human view of the monitor 19, which is as a steady state source. This conversion can be affected by the monitor's size, frequency, phosphor persistence, and by the probe's 22 sampling rate and distance from the monitor 19.

The series of test patches displayed for luminance measurement are chosen to accurately predict the monitor's performance. Each patch's size, location, color, and surround color, are chosen to eliminate the interference of monitor saturation and other unwanted effects. The effects of ambient room illumination on the gamma measurement are also either included or compensated for.

The most important, and uncontrollable, factors in good gamma correction are the monitor's brightness and contrast settings. To obtain the best possible monitor performance these controls must be properly set. To address this issue a visual discrimination test target is used. The target is a conventional visual aid that helps the user properly set the brightness and contrast controls for optimum discrimination of shadow and highlight detail. Typically the user displays the test target on monitor 19, adjusts the monitor 19 brightness/contrast control to optimize the display of the target, and then runs the gamma correction program. Display of this target is thus part of the gamma correction process.

Internal test software is used to quantify various measurement schemes based on considerations of the above factors. The test software is also used to verify the gamma correction to verify that the correction scheme is working as predicted.

4.3 Monitor 2-Dimensional Field Correction

Most of the measurement considerations discussed above also apply to the 2-D (two-dimensional) field correction. In this case the test software is used to model algorithms for the field-corrector.

4.4 Color Monitor Measurement

Having monochrome measurement, the only additional issue in color measurement is the quantification and calibration of the color response. Ideally the video normalizer color detectors match the color response of the human eye. Color scientists represent response of the average human eye by the well known CIE color matching functions. The video normalizer matches these functions as closely as possible. However, given that it is impossible to match the CIE functions exactly, one must quantify the actual color response.

The color response (which is a complex combination of filter transmittance, detector sensitivity, electronic response etc.) can be measured using a monochrometer test fixture. The monochrometer, by scanning the color spectrum across the normalizer detectors, measures the normalizer's spectral response. Given the spectral response, one can derive a calibration matrix that will convert from normalizer RGB values into true CIE coordinates. Once calibrated, the video normalizer can be used for a number of color measurement tasks. It can be programmed to measure reflection, transmission and monitor colors in various CIE derived units such as uvL, LAB, or TekHVC. The color performance of monitor 19 can be quantified, calibrated and checked for drift. The monitor 19 may be calibrated to display relative to specific white points (source color temperatures), and colormetrically accurate colors can be displayed. Colors measured from the transmission or reflection samples can be accurately displayed on the monitor 19. The application software treats color in a consistent manner and in units compatible with the video normalizer calibration.

4.5 Hardcopy Measurement

In addition to the calibration of the monitor 19, the application software supports transmission and reflection measurements. For monochrome video normalizers, units of density, percent dot, and illuminance are provided. Color video normalizers have the additional ability to measure color in conventional CIE derived units such as uvL, LAB, TekHVC etc. Color temperature measurements of monitors and ambient illumination are also possible.

This disclosure includes copyrightable material. The copyright owner gives permission to make facsimile copies of material in Patent Office files, but reserves all other copyright rights whatsoever.

This disclosure is illustrative and not limiting; further embodiments will be apparent to one of ordinary skill in the art in the light of the disclosure and are included in the scope of the appended claims.

We claim:

1. A device for correcting variations in light output of pixels of a display monitor controlled by video processing circuitry, comprising:

means for measuring light output of a group of pixels at a particular location on a screen of the display monitor;

means for representing the measured light output as digital data;

means for transferring the digital data from the device to a non-volatile storage dedicated to the display monitor so that the digital data is retained while power is not being applied to the video processing circuitry;

means for transferring the digital data from the non-volatile storage to the device at the beginning of each application of power to the video processing circuitry;

means for determining a correction, as a function of the digital data, to the light output of each pixel of the display monitor at the beginning of each application of power to the video processing circuitry; and means for providing a signal representing the correction to the video processing circuitry.

2. The device of claim 1, wherein:

the means for measuring comprises a photosensor for measuring the light output as an analog signal; and the means for representing comprises an A/D converter.

3. The device of claim 1, wherein the means for determining comprises:

a video processor for computing the correction; and a host computer connected to the video processing circuitry for controlling the video processor.

4. The device of claim 1, wherein the means for determining comprises:

means for processing the digital data;

means for connecting the means for processing to a host computer serving as a user interface;

means for receiving video timing signals;

a video frame buffer which receives processed data from the means for processing and which is controlled by the video timing signals; and means for correcting an output of the video frame buffer to correct for variations in the display monitor screen light output.

5. The device of claim 4, further comprising, in the host computer, means for performing correction of the output of the display monitor, wherein the host computer is connected to the means for processing by a serial interface.

6. The device of claim 4, further comprising means for performing a luminance correction to the light output of the display monitor.

7. A video for correcting variations in light output of pixels of a display monitor controlled by video processing circuitry, comprising:

a photosensor for measuring light output of a group of pixels at a particular location on a screen of the display monitor;

an analog to digital converter for converting the measured light output to a digital signal;

means for transferring the digital signal from the device to a non-volatile storage dedicated to the display monitor so that the information content of the digital signal is retained while power is not being applied to the video processing circuitry;

means for transferring the digital signal from the non-volatile storage to the device at the beginning of each application of power to the video processing circuitry;

means for processing the digital signal to calculate corrections to be applied to the digital signal at the beginning of each application of power to the video processing circuitry;

a frame buffer for providing correction values for each pixel on the display monitor in response to the calculated corrections, the frame buffer being synchronized to the video processing circuitry; and a correction circuit for providing a signal for correcting an output of the video processing circuitry in response to the correction values.

8. A device for correcting variations in light output of pixels of a display monitor, comprising:

means for measuring light output of a group of pixels of the display monitor at a particular location on a screen of the display monitor;

means for representing the measured light output as digital data;

means for transferring the digital data from the device to a non-volatile storage dedicated to the display monitor so that the digital data is retained while power is not being applied to the video processing circuitry;

means for transferring the digital data from the non-volatile storage to the device at the beginning of each application of power to the video processing circuitry;

means for determining a correction, as a function of the digital data, to the light output of each pixel of the display monitor at the beginning of each application of power to the video processing circuitry;

means for providing a signal representing the correction; and at least one amplifier for receiving the signal and controlling the display monitor in response thereto.

9. A method of correcting variations in light output of pixels of a display monitor controlled by video processing circuitry, comprising the steps of:

measuring light output of a group of pixels at a particular location on the display monitor with a device;

representing the measured light output as digital data;

transferring the digital data from the device to a non-volatile storage dedicated to the display monitor so that the digital data is retained while power is not being applied to the video processing circuitry;

transferring the digital data from the non-volatile storage to the device at the beginning of each application of power to the video processing circuitry;

determining a correction, as a function of the digital data, to the light output of each pixel of the display monitor at the beginning of each application of power to the video processing circuitry; and providing the correction to the video processing circuitry.

* * * * *